US011553163B1

(12) United States Patent
Chen et al.

(10) Patent No.: US 11,553,163 B1
(45) Date of Patent: Jan. 10, 2023

(54) METHOD AND SYSTEM FOR EYEBOX EXPANSION IN DISPLAY SYSTEMS

(71) Applicant: Amazon Technologies, Inc., Seattle, WA (US)

(72) Inventors: Haiwei Chen, Santa Clara, CA (US); Chulwoo Oh, Cedar Park, TX (US); Kibyung Seong, Santa Clara, CA (US); Seokchan Hong, Palo Alto, CA (US); Suchit Shah, San Jose, CA (US); Bo Qu, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/241,693

(22) Filed: Apr. 27, 2021

(51) Int. Cl.
*H04N 9/31* (2006.01)
*G02B 27/01* (2006.01)
*G02B 27/28* (2006.01)

(52) U.S. Cl.
CPC ....... *H04N 9/3152* (2013.01); *G02B 27/0172* (2013.01); *H04N 9/3161* (2013.01); *G02B 27/28* (2013.01)

(58) Field of Classification Search
CPC .... G03B 21/62; G03B 21/145; G03B 21/208; G03B 21/604; G03B 21/2013; G03B 21/2033; G03B 21/2053; G02B 27/01; G02B 27/0101; G02B 27/0103; G02B 27/0172; G02B 27/28; G02B 27/283; G02B 27/286; G02B 5/02; G02B 5/26; G02B 5/30; G02B 5/3016; G03H 1/0011; G03H 1/02; G03H 1/0236; G03H 1/0244; G03H 1/0272; G03H 1/0808; G03H 1/0841; G03H 1/2645
See application file for complete search history.

(56) References Cited

U.S. PATENT DOCUMENTS

| 2020/0103651 A1* | 4/2020 | Ando | G02B 27/4261 |
| 2020/0183152 A1* | 6/2020 | Pennell | G02B 27/0172 |
| 2021/0266474 A1* | 8/2021 | Sharma | G02B 27/0172 |

OTHER PUBLICATIONS

Chen et al., "Beam Steering for Virtual/Augmented Reality Displays with a Cycloidal Diffractive Waveplate," Optics Express, vol. 24, No. 7, Apr. 2016, 12 pages.
Lee et al., "Reflective Polarization Volume Gratings for High Efficiency Waveguide-Coupling Augmented Reality Displays," Optics Express, vol. 25, No. 22, Oct. 30, 2017, 7 pages.
Zhan et al., "Pancharatnam-Berry Optical Elements for Head-Up and Near-Eye Displays [Invited]," Journal of the Optical Society of America B, vol. 36, No. 5, May 2019, 14 pages.

* cited by examiner

*Primary Examiner* — Sultan Chowdhury
(74) *Attorney, Agent, or Firm* — Kilpatrick Townsend & Stockton LLP

(57) ABSTRACT

A method includes receiving a light beam propagating along an optical path, converting, using a first diffractive element, a first portion of the light beam into a first circularly polarized beam, and a second portion of the light beam into a second circularly polarized beam. The method also includes converting, using a second diffractive element, the first circularly polarized beam into a first circularly polarized output beam, and the second circularly polarized beam into a second circularly polarized output beam.

20 Claims, 15 Drawing Sheets

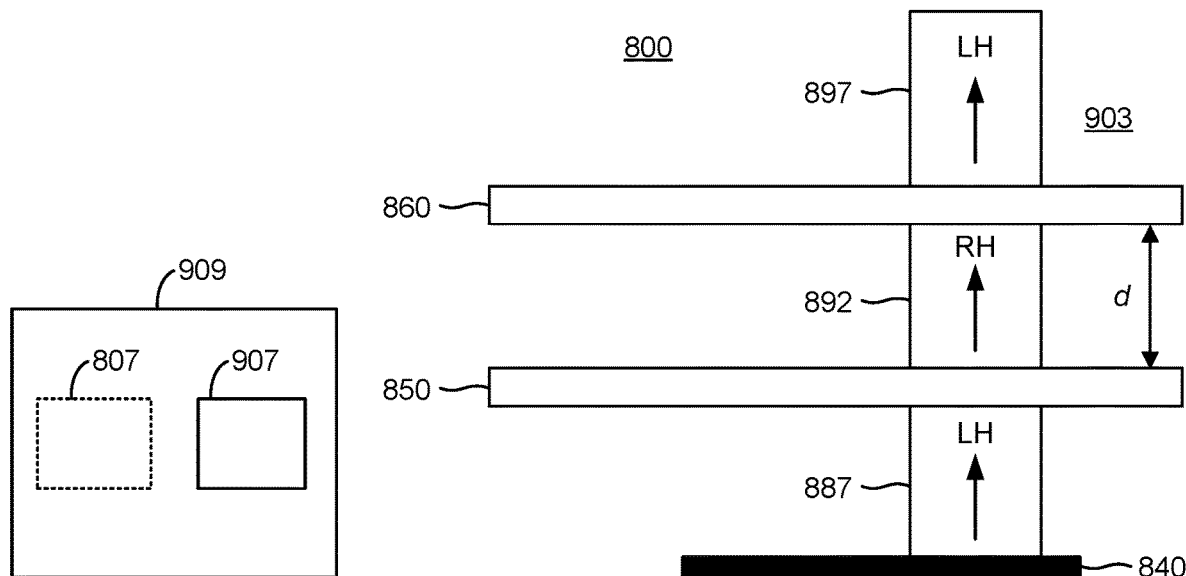
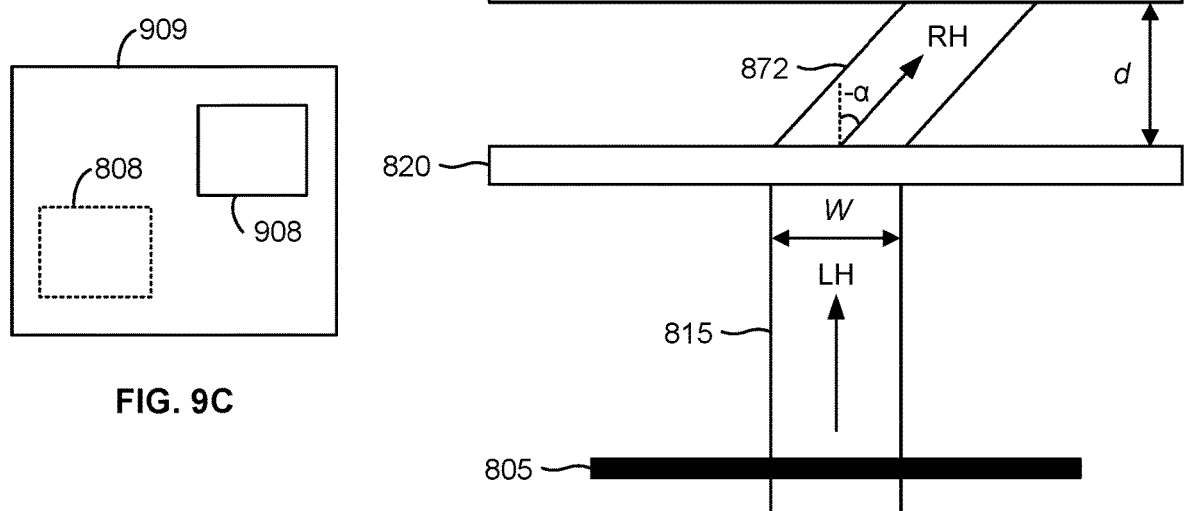
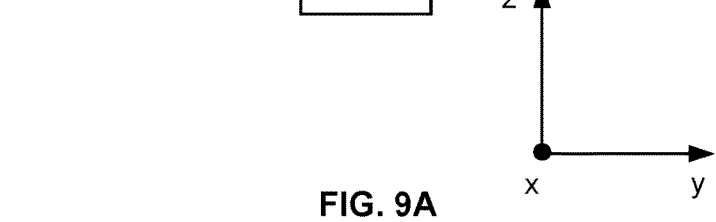
FIG. 9B
FIG. 9C
FIG. 9A

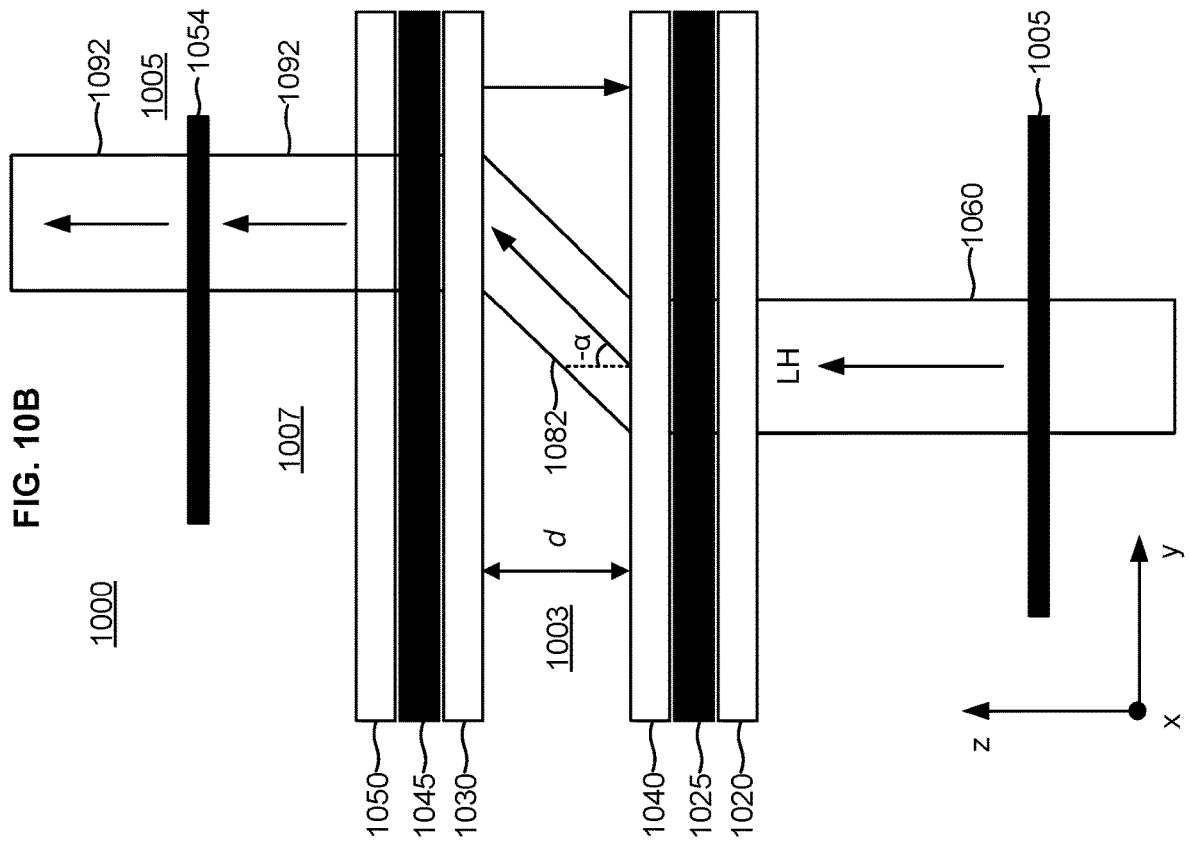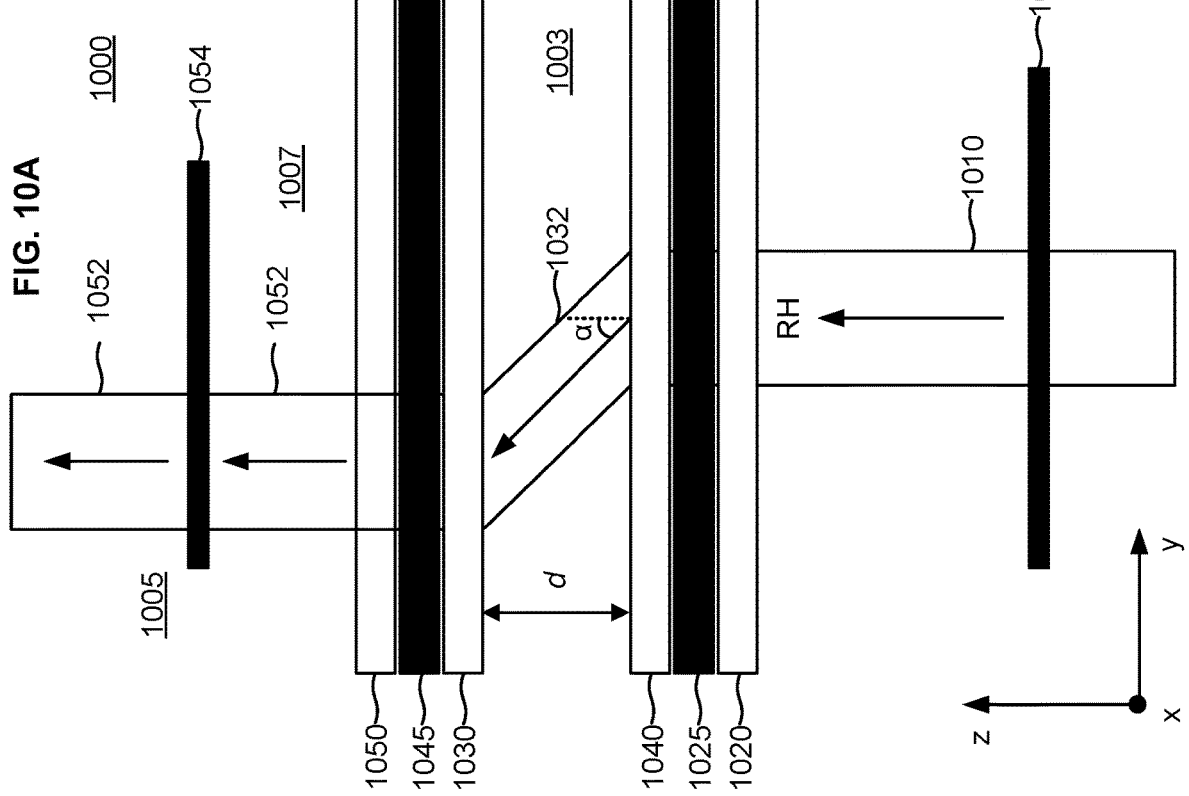

METHOD AND SYSTEM FOR EYEBOX EXPANSION IN DISPLAY SYSTEMS

BACKGROUND

Image displays, including near-eye displays, have been utilized in virtual reality and augmented reality systems. Typically, the resolution and field of view of the image, as well as the eyebox size, are system parameters of interest. Despite the progress in the area of optical systems, there is a need in the art for improved methods and systems related to image display systems.

BRIEF DESCRIPTION OF THE DRAWINGS

Various embodiments in accordance with the present disclosure will be described with reference to the drawings, in which:

FIG. 9A illustrates a schematic diagram of the optical switch illustrated in FIG. 8A in a second operating condition in accordance with an embodiment of the present disclosure.

FIG. 9B illustrates a light beam present at a first location in the optical switch illustrated in FIG. 9A.

FIG. 9C illustrates a light beam present at an output of the optical switch illustrated in FIG. 9A.

FIG. 10A illustrates a schematic diagram of an optical switch in a first operating condition in accordance with an embodiment of the present disclosure.

FIG. 10B illustrates a schematic diagram of the optical switch illustrated in FIG. 10A in a second operating condition in accordance with an embodiment of the present disclosure.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, optical systems that can be utilized in conjunction with virtual reality and augmented reality systems. As described more fully herein, the optical systems provided by various embodiments of the present disclosure enable production of multiple output light beams from a single input light beam as well as optical switches that can shift or translate an image formed at an exit pupil of the optical system, thereby providing for an expanded eyebox and improved user experience.

Figure 1:
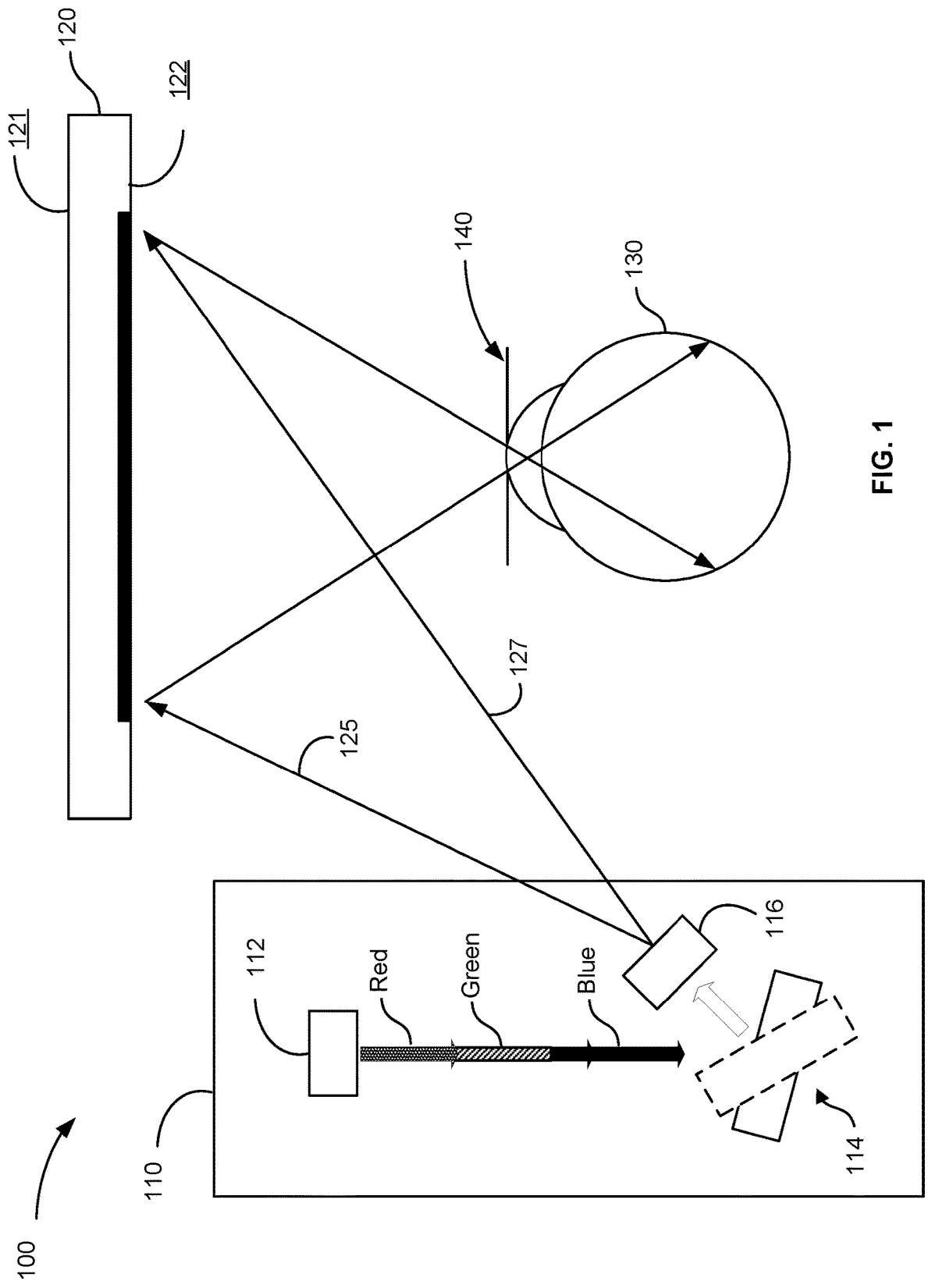
FIG. 1 illustrates a schematic diagram of a laser beam scanning augmented reality system in accordance with an embodiment of the present disclosure.

FIG. 1 illustrates a schematic diagram of a laser beam scanning augmented reality system in accordance with an embodiment of the present disclosure. As illustrated in FIG. 1, laser beam scanning augmented reality system 100 includes projector 110, which in the embodiment illustrated in FIG. 1 utilizes red-green-blue (RGB) light engine 112 and micro-electro-mechanical (MEMS) scanning mirror 114 to scan the light beam produced by RGB light engine 112 across transreflective optical element 120. In this exemplary embodiment, RGB light engine 112 produces light in the three primary colors, red, green, and blue sequentially and MEMS scanning mirror 114 scans this light across transreflective optical element 120. In FIG. 1, MEMS scanning mirror 114 is illustrated in a first scanning orientation and in an optional rotated scanning orientation. Beam shifting system 116 is included as element of projector 110 and the operation of beam shifting system 116 in producing eyebox expansion will be described more fully below.

As illustrated in FIG. 1, the beginning of the row of the pixels forming the image is illustrated by scan line 125 and the end of the row of the pixels forming the image is illustrated by scan line 127. In this embodiment, a raster scanning protocol is utilized to form the image, with the scanning of the light from projector 110 in the orthogonal direction (i.e., into and out of the plane of the figure) not shown for purposes of clarity. Although raster scanning is illustrated in this embodiment, the use of raster scanning is not required and other techniques and systems for forming an image can be utilized. Moreover, although laser scanning is illustrated in FIG. 1, other projection techniques and systems can be utilized, including liquid crystal on silicon (LCOS) projectors, liquid crystal display (LCD) projectors, micro-light emitting diode (LED) projectors, and the like.

In the augmented reality system illustrated in FIG. 1, transreflective optical element 120 is transmissive to light incident on transreflective optical element 120 from a side 121 opposite to the user and reflective to light incident from projector 110 on the side 122 facing the user, thereby directing the light from projector 110 to user's eye 130 as well as enabling the user to view the scene viewable through transreflective optical element 120. In some implementations, transreflective optical element 120 includes diffractive elements, for example, holographic films, that are used to implement the reflective character of transreflective optical element 120 in relation to light from projector 110. In other embodiments, reflective structures or combinations of diffractive and reflective structures are utilized to form an image at the exit pupil of laser beam scanning augmented reality system 100. One of ordinary skill in the art would recognize many variations, modifications, and alternatives. In the embodiment illustrated in FIG. 1, exit pupil 140 of laser beam scanning augmented reality system 100 is formed at the pupil of user's eye 130.

In virtual reality applications, transreflective optical element 120 can be replaced with a reflective optical element that does not allow light from the scene that would otherwise be viewable through transreflective optical element 120 to be transmitted to the user.

As illustrated in FIG. 1, exit pupil 140 of laser beam scanning augmented reality system 100 is formed at the pupil of user's eye 130. As will be evident to one of skill in the art, the eyebox refers to a volume at which the eye of the user receives an acceptable view of the image, usually defined with respect to a set of criteria. When the user moves their eye to view a different portion of the field of view, the motion of the eye can cause the user's pupil to move outside the eyebox. Accordingly, in augmented reality and virtual reality systems, it is advantageous to increase the size of the eyebox and, thereby, improve the user experience since the larger eyebox enables the user to shift the position of the pupil of the user's eye and still view the image produced by the projector.

Accordingly, various embodiments of the present disclosure generate multiple, spatially separated light beams that can be present at the exit pupil of laser beam scanning augmented reality system 100, thereby increasing eyebox size and improving the user experience. Thus, as the user moves their eye to view different portions of the field of view, the light beam produced using projector 110 can be shifted in the plane of the exit pupil in order to provide an image aligned with the user's pupil and increase the size of the eyebox. As described more fully herein, in some embodiments, multiple images are formed sequentially in the plane of the exit pupil of laser beam scanning augmented reality system 100 in a manner such that the individual images are positioned to correspond to the position of the user's pupil as a function of time.

Figure 2C:
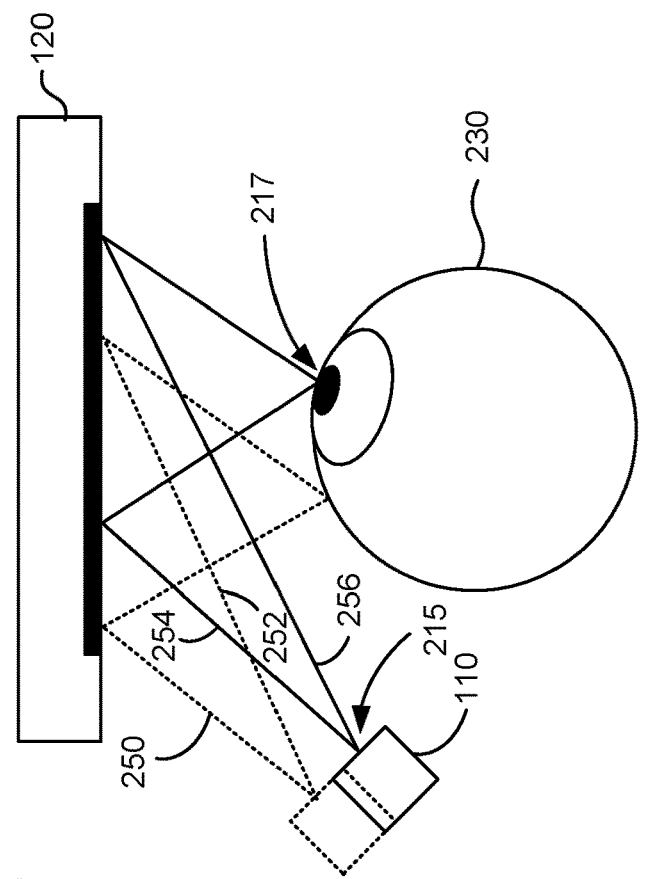
FIG. 2C illustrates a schematic diagram of a laser beam scanning augmented reality system in a second operating condition in accordance with an embodiment of the present disclosure.
Figure 2D:
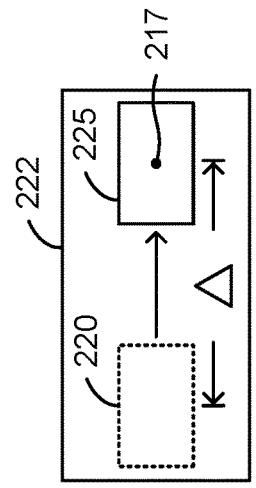
FIG. 2D illustrates a shifted image formed at an exit pupil of the laser beam scanning augmented reality system in the second operating condition in accordance with an embodiment of the present disclosure.
Figure 2A:
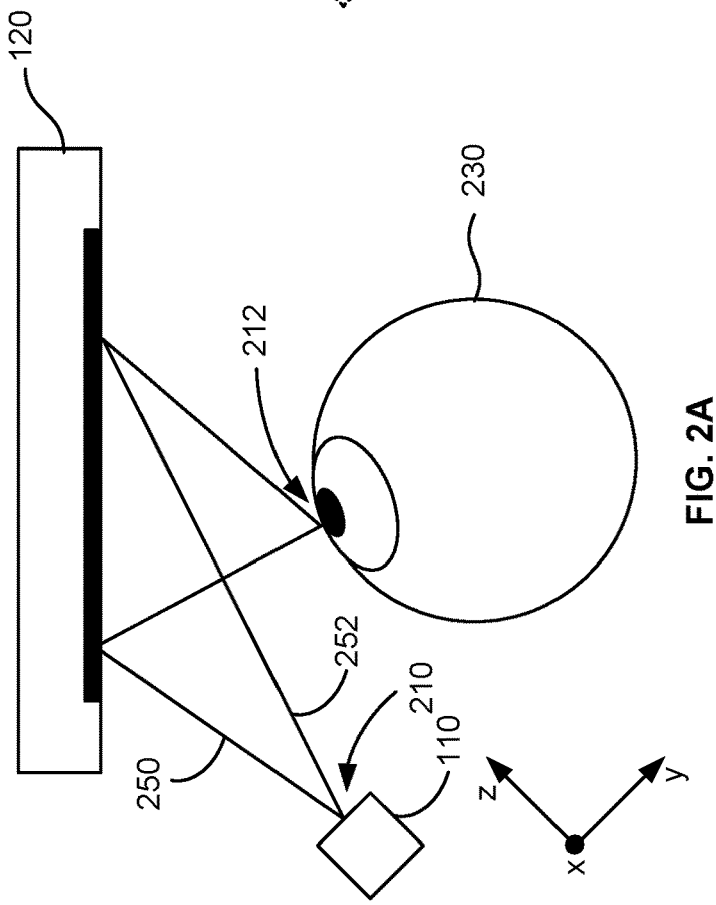
FIG. 2A illustrates a schematic diagram of a laser beam scanning augmented reality system in a first operating condition in accordance with an embodiment of the present disclosure.

FIG. 2A illustrates a schematic diagram of a laser beam scanning augmented reality system in a first operating condition in accordance with an embodiment of the present disclosure. Referring to FIG. 2A, light from projector 110 originates at location 210, is reflected from transreflective optical element 120, and forms an image at location 212, which, in this case, aligns with the pupil of user's eye 230, which is looking toward the left side of transreflective optical element 120. Although in FIG. 2A, location 210 and location 212 are illustrated as a point, it will be appreciated that the light produced by projector 110 can have a lateral extent at location 210 and the image formed at location 212 can have a lateral extent and be characterized by a resolution, for example, 1920×1080 pixels, or the like.

Figure 2B:
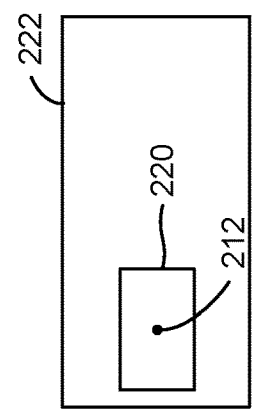
FIG. 2B illustrates an image formed at an exit pupil of the laser beam scanning augmented reality system in the first operating condition in accordance with an embodiment of the present disclosure.

FIG. 2B illustrates an image formed at an exit pupil of the laser beam scanning augmented reality system in the first operating condition in accordance with an embodiment of the present disclosure. Referring to FIG. 2B, image 220 is centered on location 212 and forms a portion of larger field of view 222. When the pupil of user's eye 230 is positioned at location 212, the user is able to view the image produced using projector 110.

FIG. 2C illustrates a schematic diagram of a laser beam scanning augmented reality system in a second operating condition in accordance with an embodiment of the present disclosure. In this second operating condition, light from projector 110 has been shifted to originate at location 215 rather than location 210. Referring to FIGS. 2A and 2C, light from the projector is shifted in the x-y plane by a distance measured along the y-axis. Thus, a lateral shift is illustrated, with the propagation of the light beam being aligned with the longitudinal direction (i.e., the direction aligned with the z-axis) and the translation of the light beam occurring in the lateral plane (i.e., the x-y plane). Accordingly, light from projector 110 is reflected from transreflective optical element 120 and forms an image at location 217. Although in FIG. 2C, location 215 and location 217 are illustrated as a point, it will be appreciated that the light produced by projector 110 can have a lateral extent at location 215 and the image formed at location 217 can have a lateral extent and be characterized by a resolution, for example, 1920× 1080 pixels, or the like.

In the embodiment illustrated in FIG. 2C, the angle subtended by scan line 250 and scan line 252 is equal to the angle subtended by scan line 254 and scan line 256. In other words, scan line 250 is parallel to scan line 254 and scan line 252 is parallel to scan line 256. Thus, despite the shift in position of the light from projector 110 from location 210 to location 215, the angular information present in the image is maintained in this embodiment. In other embodiments, the angular extent of the scanned light does not need to be constant (i.e., scan line 250 does not need to be parallel to scan line 254 and scan line 252 does not need to be parallel to scan line 256) and, in addition to the lateral shift in the position of the light from projector 110, the angle at which the light exits the projector can be modulated or varied, resulting in a modulation in the angle of the light from projector 110, resulting in a corresponding shift in the position of the image formed at the exit pupil of the laser beam scanning augmented reality system.

FIG. 2D illustrates a shifted image formed at an exit pupil of the laser beam scanning augmented reality system in the second operating condition in accordance with an embodiment of the present disclosure. In this second operating condition, image 225 is centered on location 217 and forms a portion of larger field of view 222. In FIG. 2C, the pupil of the user's eye has been shifted by a lateral shift A with respect to the position illustrated in FIG. 2A. Accordingly, the lateral shift in the position of the image from location 212 to location 217 enables the user to view the image, which is now aligned with the pupil of the user's eye since the user is now looking toward the right side of transreflective optical element 120. As will be evident to one of skill in the art, a suitable eye tracking system can be utilized to track the position of the pupil of the user's eye and provide inputs to enable the corresponding shift in position of the image formed at the exit pupil of the laser beam scanning augmented reality system.

Thus, by shifting the position of the image at the exit pupil of the laser beam scanning augmented reality system in a manner that corresponds to the shift in the user's eye position/orientation, the user is able to view the image produced using projector 110 while looking in different directions.

Figure 3:
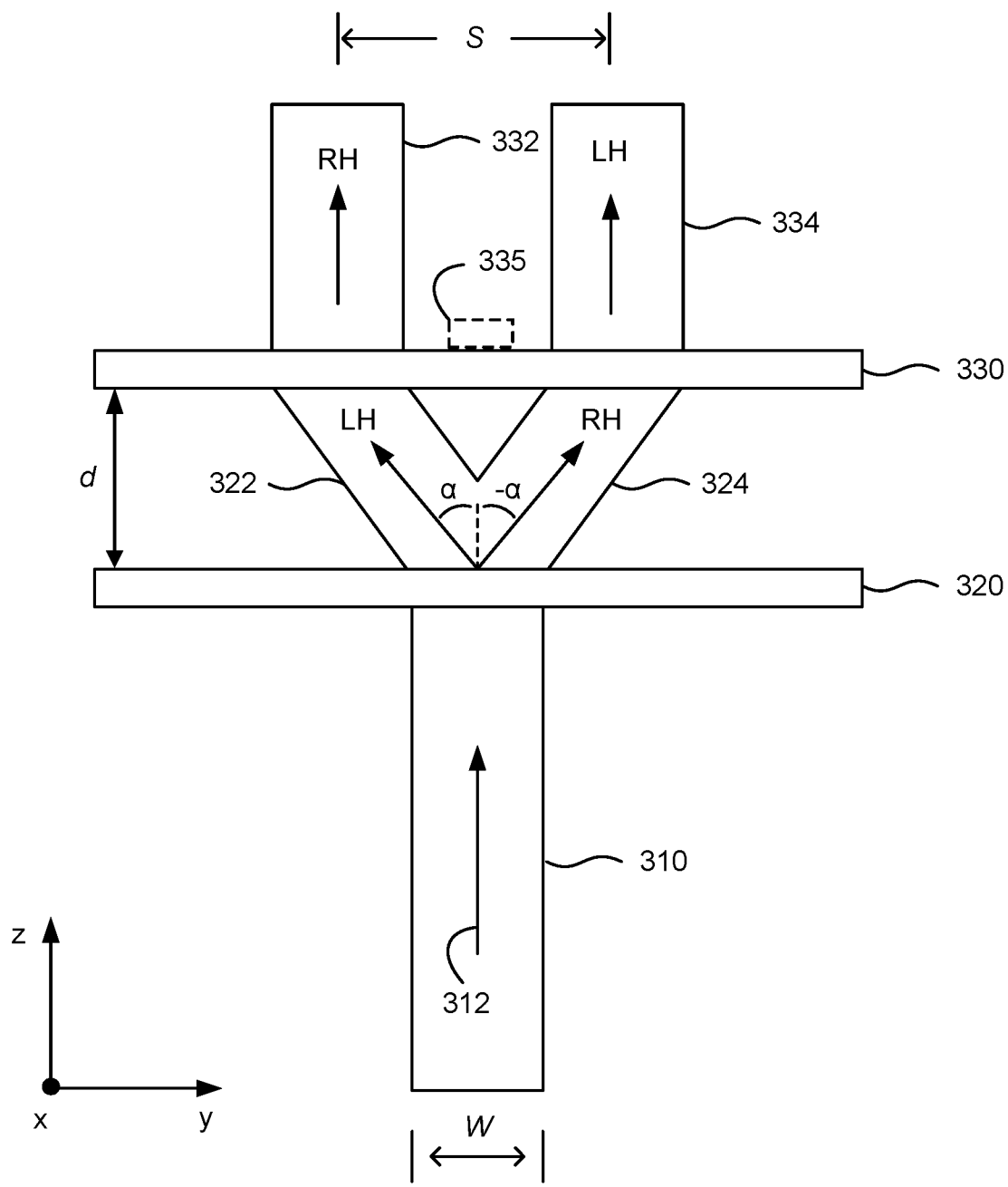
FIG. 3 illustrates a schematic diagram of a beam multiplication system in accordance with an embodiment of the present disclosure.

FIG. 3 illustrates a schematic diagram of a beam multiplication system 300 in accordance with an embodiment of the present disclosure. Referring to FIG. 3, light beam 310 is propagating along optical path 312, which in this example, is aligned with the z-axis, also referred to as the longitudinal direction. Light beam 310 has a cross-sectional width of W in this embodiment and can be produced, for example, using a MEMS scanning mirror. The width W may characterize the beam waist of light beam 310, for example, a beam waist of a Gaussian beam. Light beam 310 can be linearly polarized, for example, polarized to align with the x-axis or the y-axis, or can be unpolarized. Thus, for example, if the laser source is linearly polarized, the projector could maintain this linear polarization and produce a polarized beam as light beam 310.

Light beam 310 is incident on a first diffractive element 320, which converts a first portion of light beam 310 into a first circularly polarized beam propagating along a first predetermined direction and a second portion of light beam 310 into a second circularly polarized beam propagating along a second predetermined direction. As illustrated in FIG. 3, light beam 310 is converted by first diffractive element 320 into a left-hand circularly polarized beam 322 propagating at an angle α and a right-hand circularly polarized beam 324 propagating at angle −α. For collimated light beam 310, left-hand circularly polarized beam 322 and right-hand circularly polarized beam 324 are also collimated.

An exemplary first diffractive element 320 is a liquid-crystal-based Pancharatnam-Berry phase optical element (PBOE), which can be referred to as a holographic deflector, a cycloidal diffractive wave plate, or a PB deflector. Pancharatnam-Berry deflectors are planar holographic structures that can be implemented in the form of one or more diffractive films and utilize patterning of the orientation of the anisotropy axis to diffract incident light as well as convert unpolarized light or linearly polarized light into circularly polarized light. Thus, as illustrated in FIG. 3, light beam 310 is diffracted by first diffractive element 320 to form first positive diffracted order (i.e., m=+1) left-hand circularly polarized beam 322 and to form first negative diffracted order (m=−1) right-hand circularly polarized beam 324. In some embodiments, only the first positive diffracted order and the first negative diffracted order are produced by the interaction of light beam 310 and first diffractive element 320, with the zero diffracted order, as well as higher positive and negative diffracted orders, being suppressed. As will be evident to one of skill in the art, the angles at which the diffracted orders exist as well as power distribution between the various diffracted orders are functions of the design of the Pancharatnam-Berry deflectors.

If light beam 310 is unpolarized and all diffracted orders other than the first positive diffracted order and the first negative diffracted order are suppressed, then 50% of the diffracted light will be present in left-hand circularly polarized beam 322 and 50% of the diffracted light will be present in right-hand circularly polarized beam 324. Similarly, if light beam 310 is linearly polarized and all diffracted orders other than the first positive diffracted order and the first negative diffracted order are suppressed, then 50% of the diffracted light will be present in left-hand circularly polarized beam 322 and 50% of the diffracted light will be present in right-hand circularly polarized beam 324.

A second diffractive element 330 is positioned a distance d, which can also be referred to as a longitudinal separation distance, from first diffractive element 320 and is aligned to be parallel to first diffractive element 320. In some embodiments, the distance d is selected such that:

$$d > \frac{W}{\tan(\alpha)},$$

where $$\sin(\alpha) = \lambda/\Lambda,$$

where $\lambda$ is the wavelength of the input light beam and $\Lambda$ is the grating spacing of the diffractive elements.

Second diffractive element 330 receives left-hand circularly polarized beam 322 and right-hand circularly polarized beam 324, which are propagating at angles α and −α, respectively. Second diffractive element 330, which can be identical to first diffractive element 320, thereby providing for the interchangeability of second diffractive element 330 and first diffractive element 320, converts left-hand circularly polarized beam 322 into a right-hand circularly polarized output beam 332 propagating parallel to the optical path and right-hand circularly polarized beam 324 into a left-hand circularly polarized output beam 334 that is also propagating parallel to the optical path. Thus, the use of an unpolarized or linearly polarized input beam and first diffractive element 320 in combination with second diffractive element 330 results in conversion of the unpolarized or linearly polarized input beam into two circularly polarized beams as well as the multiplication of the single input beam into two output beams. The propagation direction of light beam 310 as well as right-hand circularly polarized output beam 332 and left-hand circularly polarized output beam 334 is along the direction of the optical path, i.e., aligned with the longitudinal z-axis. In other embodiments, first diffractive element 320 and second diffractive element 330 are not identical, for example, characterized by differing diffractive structure periodicity. If the second diffractive element 330 has a different diffractive structure periodicity than first diffractive element 320, then second diffractive element 330 will be characterized by a diffraction angle different than diffraction angle α. As a result, right-hand circularly polarized output beam 332 and left-hand circularly polarized output beam 334 will propagate at an angle with respect to the direction of the optical path. Thus, although some embodiments discussed herein produce output beams propagating along the same direction as the input beam, this is not required and some embodiments may produce output beams propagating at an angle that is not aligned with the optical path.

Thus, as illustrated in FIG. 3, the use of second diffractive element 330 results in a change in the handedness of the left-hand circularly polarized beam 322 as well as a redirection of the right-hand circularly polarized output beam 332 to propagate parallel to the optical path and a change in the handedness of the right-hand circularly polarized beam 324 as well as a redirection of the left-hand circularly polarized output beam 334 to propagate parallel to the optical path. The diffraction angle α and the distance d (i.e., the longitudinal separation distance) between first diffractive element 320 and second diffractive element 330 result in the lateral spatial separation of right-hand circularly polarized output beam 334 and left-hand circularly polarized output beam 334 by a separation distance s measured orthogonal to the optical path. Accordingly, various embodiments of the present disclosure provide systems that, depending on the distance d and the diffraction angle α, multiply a single input light beam (e.g., light beam 310) into spatially separated output light beams that are laterally separated from each other by separation distance s (e.g., between right-hand circularly polarized output beam 332 and left-hand circularly polarized output beam 334) measured orthogonal to the optical path. An optional absorber 335 may be positioned adjacent second diffractive element 330 to absorb light diffracted into the m=0 order by first diffractive element 320. Accordingly, right-hand circularly polarized output beam 332 and left-hand circularly polarized output beam 334 do not overlap in some embodiments, but are laterally separated from each other. In other embodiments, right-hand circularly polarized output beam 332 and left-hand circularly polarized output beam 334 overlap to some extent, with lateral separation distance s being less than width W or equal to zero. As an example, if Gaussian beams are utilized and lateral separation distance s is equal to width 2 W, the tails of the Gaussian beams can overlap although the centers of the Gaussian beams are separated by lateral separation distance s. Referring to FIGS. 2B and 2D, the lateral shift A between image 220 and image 225 can be produced by utilizing the various embodiments of the present disclosure as described herein.

Figure 4A:
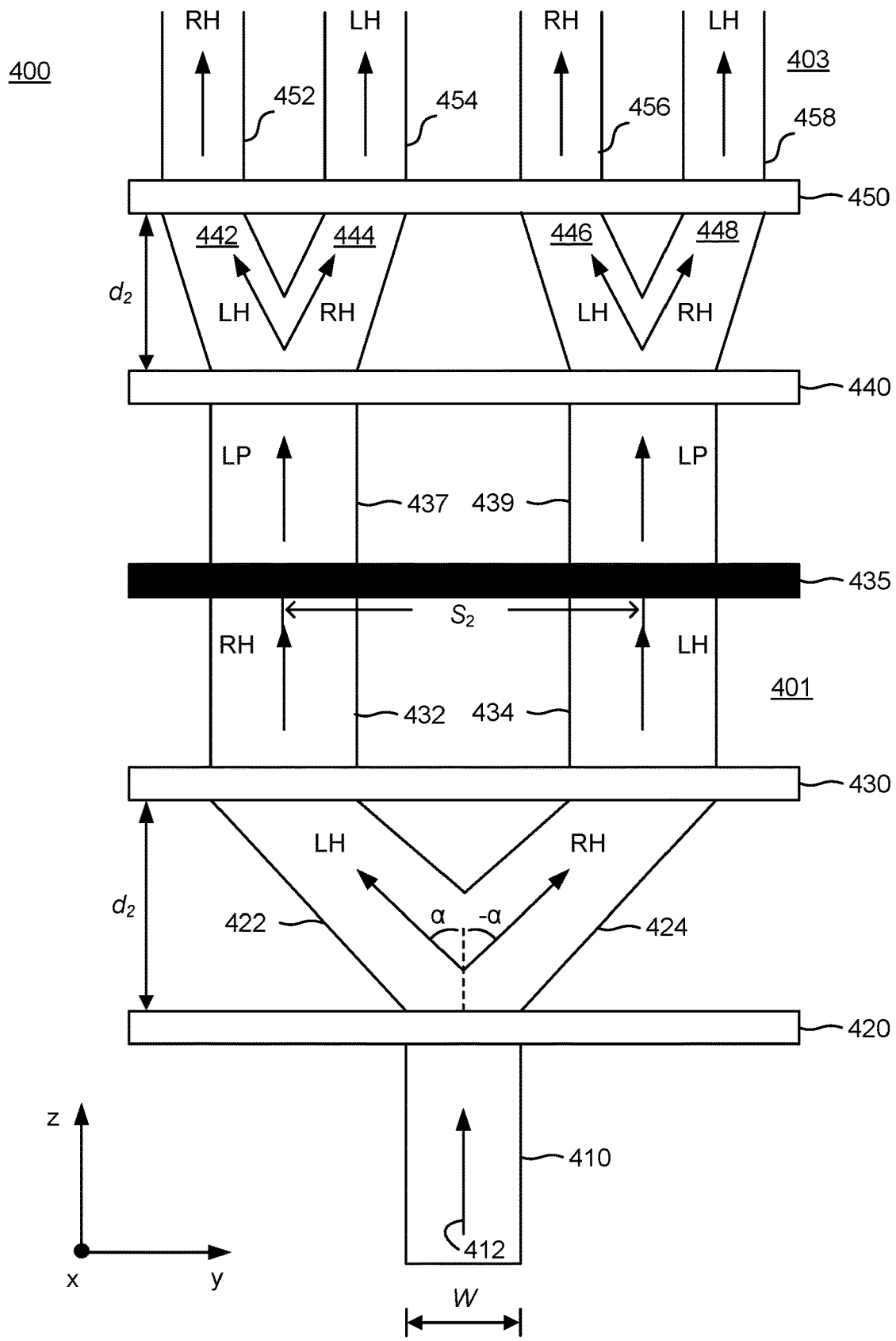
FIG. 4A illustrates a schematic diagram of another beam multiplication system in accordance with an embodiment of the present disclosure.
Figure 5:
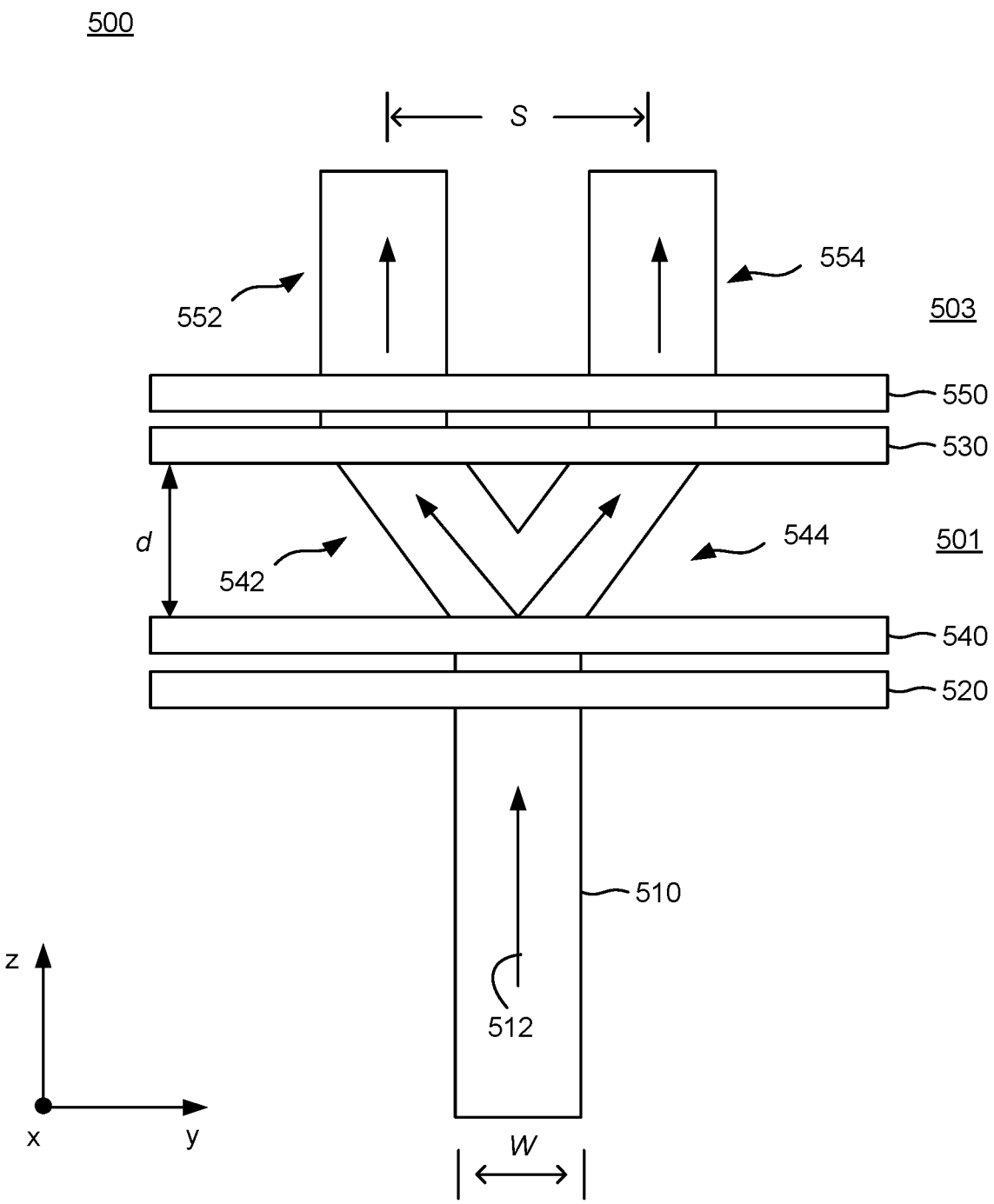
FIG. 5 illustrates a schematic diagram of a beam multiplication system in accordance with another embodiment of the present disclosure.

Therefore, the beam multiplication system illustrated in FIG. 3 enables the conversion of a single input beam into two output beams having a predetermined, lateral spatial separation distance s between the output beams. As described more fully below, although FIG. 3 illustrates a system with two output beams, multiple pairs of diffractive elements can be cascaded to generate additional output beams, for example, four output beams as illustrated in FIGS. 4A and 5 discussed more fully below. Moreover, by using active polarization control, the spatial separation functionality can be utilized to select an output beam positioned at a predetermined location with respect to the input beam, enabling shifting of the image formed at the exit pupil of a laser beam scanning augmented reality system, for example, to correspond to the location of the pupil of the user's eye. One of ordinary skill in the art would recognize many variations, modifications, and alternatives.

FIG. 4A illustrates a schematic diagram of another beam multiplication system in accordance with an embodiment of the present disclosure. As will be described, beam multiplication system 400 produces four output beams, with a lateral, spatial separation between each of two sets of the output beams in both the y-direction as well as the x-direction.

Referring to FIG. 4A, light beam 410 is propagating along optical path 412, which in this example, is aligned with the z-axis, also referred to as the longitudinal direction. Light beam 410 has a cross-sectional width of Win this embodiment and can be produced, for example, using a MEMS scanning mirror. Light beam 410 can be linearly polarized, for example, polarized to align with the x-axis or the y-axis, or can be unpolarized. Thus, for example, if the laser source is linearly polarized, the projector could maintain this linear polarization and produce a polarized beam as light beam 410.

Light beam 410 is incident on a first diffractive element 420, which converts a first portion of light beam 410 into a first circularly polarized beam propagating along a first predetermined direction and a second portion of light beam 410 into a second circularly polarized beam propagating along a second predetermined direction. As illustrated in FIG. 4A, light beam 410 is converted by first diffractive element 420 into a left-hand circularly polarized beam 422 (also referred to as a first circularly polarized beam) propagating at an angle α and a right-hand circularly polarized beam 424 (also referred to as a second circularly polarized beam) propagating at angle −α. For collimated light beam 410, left-hand circularly polarized beam 422 and right-hand circularly polarized beam 424 are also collimated.

Thus, as illustrated in FIG. 4A, light beam 410 is diffracted by first diffractive element 420 to form first positive diffracted order (i.e., m=+1) left-hand circularly polarized beam 422 and to form first negative diffracted order (m=−1) right-hand circularly polarized beam 424. In some embodiments, only the first positive diffracted order and the first negative diffracted order are produced by the interaction of light beam 410 and first diffractive element 420, with the zero diffracted order, as well as higher positive and negative diffracted orders being suppressed. As will be evident to one of skill in the art, the angles at which the diffracted orders exist as well as power distribution between the various diffracted orders are functions of the design of the Pancharatnam-Berry deflectors.

If light beam 410 is unpolarized and all diffracted orders other than the first positive diffracted order and the first negative diffracted order are suppressed, then 50% of the diffracted light will be present in left-hand circularly polarized beam 422 and 50% of the diffracted light will be present in right-hand circularly polarized beam 424. Similarly, if light beam 410 is linearly polarized and all diffracted orders other than the first positive diffracted order and the first negative diffracted order are suppressed, then 50% of the diffracted light will be present in left-hand circularly polarized beam 422 and 50% of the diffracted light will be present in right-hand circularly polarized beam 424. In some embodiments, the width W is conserved as light beams propagate through the various optical elements described herein, enabling beam multiplication and switching without changes in the beam size.

A second diffractive element 430 is positioned a distance $d_2$, which can also be referred to as a longitudinal separation distance, from first diffractive element 420 and is aligned to be parallel to first diffractive element 420. In comparison with the longitudinal separation distance d illustrated in FIG. 3, the spacing between first diffractive element 420 and second diffractive element 430 enables left-hand circularly polarized beam 422 and right-hand circularly polarized beam 424 to be laterally separated from each other by a suitable distance such that the lateral spatial separation between all four light beams generated using beam multiplication system 400 results in non-overlapping light beams.

Second diffractive element 430 receives left-hand circularly polarized beam 422 and right-hand circularly polarized beam 424, which are propagating at angles α and −α, respectively. Second diffractive element 430, which can be identical to first diffractive element 420, thereby providing for the interchangeability of second diffractive element 430 and first diffractive element 420, converts left-hand circularly polarized beam 422 into a right-hand circularly polarized output beam 432 (also referred to as a first circularly polarized output beam) propagating parallel to the optical path and right-hand circularly polarized beam 424 into a left-hand circularly polarized output beam 434 (also referred to as a second circularly polarized output beam) that is also propagating parallel to the optical path. Thus, the use of an unpolarized or linearly polarized input beam and first diffractive element 420 in combination with second diffractive element 430 results in conversion of the unpolarized or linearly polarized input beam into two circularly polarized beams as well as the multiplication of the single input beam into two output beams. The propagation direction of light beam 410 as well as right-hand circularly polarized output beam 432 and left-hand circularly polarized output beam 434 is along the direction of the optical path, i.e., aligned with the longitudinal z-axis.

Thus, as illustrated in FIG. 4A, the use of second diffractive element 430 results in a change in the handedness of the left-hand circularly polarized beam 422 as well as a redirection of the right-hand circularly polarized output beam 434 to propagate parallel to the optical path and a change in the handedness of the right-hand circularly polarized beam 424 as well as a redirection of the left-hand circularly polarized output beam 434 to propagate parallel to the optical path. The diffraction angle α and the distance $d_2$ (i.e., the longitudinal separation distance) between first diffractive element 420 and second diffractive element 430 result in the lateral spatial separation of right-hand circularly polarized output beam 432 and left-hand circularly polarized output beam 434 by a separation distance $s_2$ (e.g., between right-hand circularly polarized output beam 432 and left-hand circularly polarized output beam 434). Accordingly, first diffractive element 420 and second diffractive element 430, depending on the distance $d_2$ and the diffraction angle α, multiply a single input light beam (e.g., light beam 410) into spatially separated output light beams that are laterally separated from each other by separation distance $s_2$. The spatial separation of right-hand circularly polarized output beam 432 and left-hand circularly polarized output beam 434 occurs in the y-direction. As described below, a second stage of diffractive elements will utilize beams based on right-hand circularly polarized output beam 432 and left-hand circularly polarized output beam 434 as input beams in order to generate four output beams, each separated from the other output beams in both the y-direction and the x-direction.

Figure 4B:
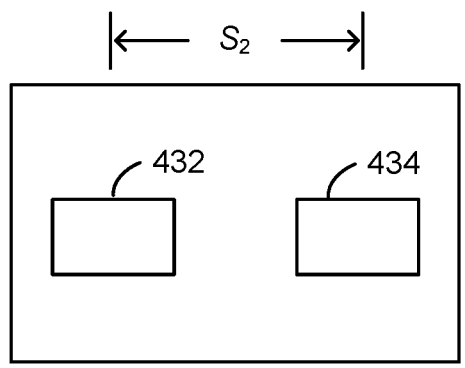
FIG. 4B illustrates a set of light beams present at a first location in the beam multiplication system illustrated in FIG. 4A.

FIG. 4B illustrates a set of light beams present at a first location in the beam multiplication system illustrated in FIG. 4A. At first location 401 in the lateral plane, light beam 410 has been converted into two output beams (i.e., right-hand circularly polarized output beam 432 and left-hand circularly polarized output beam 434) spatially separated from each other in the lateral y-direction by a separation distance $s_2$.

Referring once again to FIG. 4A, quarter wave plate 435 is positioned along the optical path after first diffractive element 420 and second diffractive element 430. Right-hand circularly polarized output beam 432 is converted by quarter wave plate 435 into linearly polarized input beam 437 (also referred to as a first linearly polarized beam) and left-hand circularly polarized output beam 434 is converted by quarter wave plate 435 into linearly polarized input beam 439 (also referred to as a second linearly polarized beam). As described more fully below, a second set of diffractive elements is utilized in order to multiply each of the two input beams to form two sets of output beams and to spatially separate each set of output beams by a distance measured along the x-direction, thereby providing four output beams located at different lateral positions in the x-y plane.

First, considering linearly polarized input beam 437, this beam is incident on a third diffractive element 440, which converts a first portion of linearly polarized input beam 437 into a first circularly polarized beam propagating along the first predetermined direction and a second portion of linearly polarized input beam 437 into a second circularly polarized beam propagating along the second predetermined direction. As illustrated in FIG. 4A, left-hand circularly polarized beam 442 (also referred to as a third circularly polarized beam) is propagating at an angle α and right-hand circularly polarized beam 444 (also referred to as a fourth circularly polarized beam) is propagating at angle −α. Since linearly polarized input beam 437 was collimated, left-hand circularly polarized beam 442 and right-hand circularly polarized beam 444 are also collimated.

Although FIG. 4A illustrates the diffraction of linearly polarized input beam 437 into a first positive diffracted order (i.e., m=+1) and a first negative diffracted order (m=−1) lying in the plane of the figure, it will be appreciated that left-hand circularly polarized beam 442 and right-hand circularly polarized beam 444 are propagating at angles ±α with respect to the plane of the figure. Thus, the orientation of third diffractive element 440 is aligned in order to diffract the input light into two diffracted orders with angles measured with respect to the x-axis.

A fourth diffractive element 450 is positioned a distance $d_2$, which can also be referred to as a longitudinal separation distance, from third diffractive element 440 and is aligned to be parallel to third diffractive element 440. Fourth diffractive element 450 receives left-hand circularly polarized beam 442 and right-hand circularly polarized beam 444, which are propagating at angles α and −α lying in the x-z plane, respectively. Fourth diffractive element 450, which can be identical to third diffractive element 440, thereby providing for the interchangeability of fourth diffractive element 450 and third diffractive element 440, converts left-hand circularly polarized beam 442 into a first right-hand circularly polarized output beam 452 (also referred to as a third circularly polarized output beam) propagating parallel to the optical path and right-hand circularly polarized beam 444 into a first left-hand circularly polarized output beam 454 (also referred to as a fourth circularly polarized output beam) that is also propagating parallel to the optical path.

Thus, in a manner similar to the first set of diffractive elements, third diffractive element 440 and fourth diffractive element 450 receive an input beam and provide two output beams, but with the two output beams spatially separated from each other by a separation distance measured along the x-axis. The propagation direction of first right-hand circularly polarized output beam 452 as well as first left-hand circularly polarized output beam 454 is along the direction of the optical path, i.e., aligned with the longitudinal z-axis.

Thus, as illustrated in FIG. 4A, the use of fourth diffractive element 450 results in a change in the handedness of the left-hand circularly polarized beam 442 as well as a redirection of the first right-hand circularly polarized output beam 452 to propagate parallel to the optical path and a change in the handedness of the right-hand circularly polarized beam 444 as well as a redirection of the first left-hand circularly polarized output beam 454 to propagate parallel to the optical path.

Considering linearly polarized input beam 439, this beam is incident on third diffractive element 440, which converts a first portion of linearly polarized input beam 439 into a first circularly polarized beam propagating along the first predetermined direction and a second portion of linearly polarized input beam 439 into a second circularly polarized beam propagating along the second predetermined direction. As illustrated in FIG. 4A, left-hand circularly polarized beam 446 (also referred to as a fourth circularly polarized beam) is propagating at an angle α and right-hand circularly polarized beam 448 (also referred to as a fifth circularly polarized beam) is propagating at angle −α. Since linearly polarized input beam 439 was collimated, left-hand circularly polarized beam 446 and right-hand circularly polarized beam 448 are also collimated.

Although FIG. 4A illustrates the diffraction of linearly polarized input beam 439 into a first positive diffracted order (i.e., m=+1) and a first negative diffracted order (m=−1) lying in the plane of the figure, it will be appreciated that left-hand circularly polarized beam 446 and right-hand circularly polarized beam 448 are propagating at angles ±α with respect to the plane of the figure. Thus, the orientation of third diffractive element 440 is aligned in order to diffract the input light into two diffracted orders with angles measured with respect to the x-axis.

Fourth diffractive element 450 receives left-hand circularly polarized beam 446 and right-hand circularly polarized beam 448, which are propagating at angles α and −α lying in the x-z plane, respectively. Fourth diffractive element 450 converts left-hand circularly polarized beam 446 into second right-hand circularly polarized output beam 456 (also referred to as a fifth circularly polarized output beam) propagating parallel to the optical path and right-hand circularly polarized beam 448 into second left-hand circularly polarized output beam 458 (also referred to as a sixth circularly polarized output beam) that is also propagating parallel to the optical path.

Thus, as illustrated in FIG. 4A, the use of fourth diffractive element 450 results in a change in the handedness of left-hand circularly polarized beam 446 as well as a redirection of the second right-hand circularly polarized output beam 456 to propagate parallel to the optical path and a change in the handedness of right-hand circularly polarized beam 448 as well as a redirection of second left-hand circularly polarized output beam 458 to propagate parallel to the optical path.

In combination, the first set of diffractive elements and the second set of diffractive elements introduce, depending on diffraction angle α and the distance $d_2$ (i.e., the longitudinal separation distance) between the sets of diffractive elements, a lateral spatial separation $s_2$ of the four output beams in both the y-direction and the x-direction.

In other embodiments, if the diffraction angle associated with the diffractive elements and/or the longitudinal distance between adjacent diffraction elements in a set of diffractive elements is changed, the separation distances measured along the y-axis or the x-axis can be different. Thus, the lateral separation distance between beams can differ along different directions. Moreover, the output beams can propagate at an angle with respect to the direction of the optical path if the diffraction angles associated with the diffractive elements are different. Thus, embodiments provide both output beams aligned with the optical path and output beams propagating at angles that are not aligned with the optical path. One of ordinary skill in the art would recognize many variations, modifications, and alternatives.

Figure 4C:
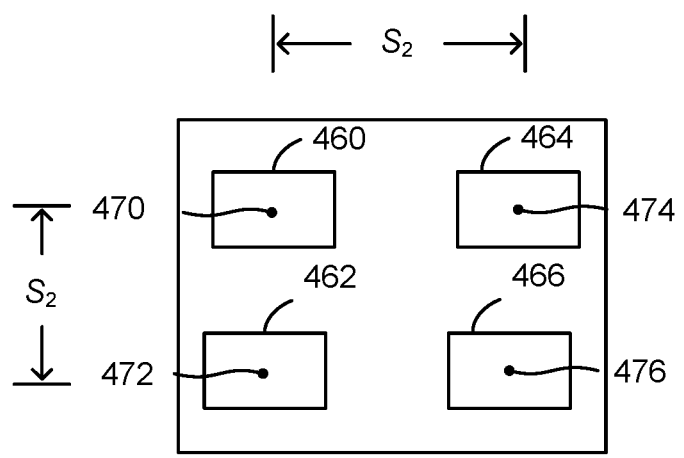
FIG. 4C illustrates a second set of light beams present at an output of the beam multiplication system illustrated in FIG. 4A.

FIG. 4C illustrates a second set of light beams present at an output of the beam multiplication system illustrated in FIG. 4A. At the output of beam multiplication system 400, which can be referred to as a second location 403 in the lateral plane, linearly polarized input beam 410 has been converted into four output beams spatially separated from each other in the lateral y-direction by a separation distance $s_2$ and in the lateral x-direction by the separation distance $s_2$. As illustrated in FIG. 4C, image 460 and image 462, which were produced based on linearly polarized input beam 437, are centered on locations 470 and 472, respectively. Image 464 and image 466, which were produced based on linearly polarized input beam 439, are centered on locations 474 and 476, respectively. Accordingly, starting with a single linearly polarized input light beam 410, four, laterally separated output light beams are produced using beam multiplication system 400, increasing the eyebox for a user when the four, laterally separated output light beams are present at the pupil of a user's eye.

Thus, by using two sets of diffractive elements, each introducing a lateral separation between output beams along two axes, a linearly polarized input light beam has been converted into four output beams, each separated from adjacent output beams by a separation distance $s_2$. By using active polarization control as described in relation to FIGS. 8A-C and 9A-C, the beam multiplication and spatial separation functionality can be utilized to select an output beam positioned at a predetermined location with respect to the input beam, enabling shifting of the image formed at the exit pupil of a laser beam scanning augmented reality system, for example, to correspond to the location of the pupil of the user's eye. One of ordinary skill in the art would recognize many variations, modifications, and alternatives.

FIG. 5 illustrates a schematic diagram of a beam multiplication system in accordance with another embodiment of the present disclosure. As will be described, beam multiplication system 500 produces four output beams, with a lateral, spatial separation between each of two sets of the output beams in both the y-direction as well as the x-direction.

Referring to FIG. 5A, light beam 510 is propagating along optical path 512, which in this example, is aligned with the z-axis (i.e., the longitudinal direction). Light beam 510 has a cross-sectional width of W in this embodiment and can be produced, for example, using a MEMS scanning mirror. Light beam 510 can be linearly polarized, for example, polarized to align with the x-axis or the y-axis, or can be unpolarized. Thus, for example, if the laser source is linearly polarized, the projector could maintain this linear polarization and produce a polarized beam as light beam 510.

Light beam 510 is incident on a first diffractive element 520, which converts light beam 510 into a left-hand circularly polarized beam propagating at an angle α with respect to the y-axis and a right-hand circularly polarized beam propagating at angle −α with respect to the y-axis. Since light beam 510 is collimated, the left-hand circularly polarized beam and right-hand circularly polarized beam that are produced after diffraction produced by first diffractive element 520 are also collimated. The operation of first diffractive element 520 is thus similar to that described with respect to first diffractive element 420 illustrated in FIG. 4A.

The left-hand circularly polarized beam and the right-hand circularly polarized beam produced by first diffractive element 520, propagating at an angle ±α with respect to the y-axis, respectively, are now diffracted by third diffractive element 540. The operation of third diffractive element 540 is similar to that described with respect to third diffractive element 440 illustrated in FIG. 4A. Namely, each of the left-hand circularly polarized beam and the right-hand circularly polarized beam is converted into two sets of left-hand circularly polarized and right-hand circularly polarized beams, propagating at angles ±α with respect to the x-axis. Referring to FIG. 5, although only two beams are illustrated at location 501 between the sets of diffractive elements, it will be appreciated that four beams are present, a set of beams 542 propagating at angle α with respect to the y-axis and angles ±α with respect to the x-axis and a set of beams 544 propagating at angle −α with respect to the y-axis and angles ±α with respect to the x-axis.

In some embodiments, first diffractive element 520 and third diffractive element 540 are fabricated as films that are in close proximity. As an example, first diffractive element 520 could be fabricated as a holographic film on a first substrate, third diffractive element 540 could be fabricated as a holographic film on a second substrate, and the first substrate and second substrate could be joined together to form a single optical element.

In order to redirect the set of beams 542 and the set of beams 544 to propagate parallel to the optical path (i.e., along the z-direction), second diffractive element 530 and fourth diffractive element 550 are positioned a distance d from first diffractive element 520 and third diffractive element 540. Diffraction by second diffractive element 530 and fourth diffractive element 550 also results in a change in the handedness of each of the four beams incident on second diffractive element 530 and fourth diffractive element 550. Although only two beams are illustrated at location 503 after the second set of diffractive elements, it will be appreciated that four beams are present.

Accordingly, four output beams are generated after diffraction from second diffractive element 530 and fourth diffractive element 550. The first set of output beams 552 and the second set of output beams 554 are laterally separated by lateral separation distance s measured along the y-axis. Each of the two beams making up the set of output beams 552 is laterally separated by lateral separation distance s measured along the x-axis and each of the two beams making up the set of output beams 554 is also laterally separated by lateral separation distance s measured along the x-axis. Thus, the two output beams included in the set of output beams 552 and the two output beams in the set of output beams 554 are each separated from adjacent output beams by a lateral spatial separation s in both the y-direction and the x-direction.

Thus, by using two sets of diffractive elements, the first set introducing angled light beams and the second set redirecting the beams to a direction parallel to the optical path and changing the handedness of the diffracted beams, a linearly polarized input beam has been converted into four output beams, each separated from adjacent output beams by a separation distance s. By using active polarization control as described in relation to FIGS. 8A-C and 9A-C, the beam multiplication and spatial separation functionality can be utilized to select an output beam positioned at a predetermined location with respect to the input beam, enabling shifting of the image formed at the exit pupil of a laser beam scanning augmented reality system, for example, to correspond to the location of the pupil of the user's eye. One of ordinary skill in the art would recognize many variations, modifications, and alternatives.

Therefore, beam multiplication system 500 illustrated in FIG. 5 provides four output beams in a manner similar to that achieved using beam multiplication system 400 illustrated in FIG. 4. Beam multiplication system 400 utilizes distance $d_2$ to separate first diffractive element 420 and second diffractive element 430, as well as an additional distance $d_2$ to separate third diffractive element 440 and fourth diffractive element 450, resulting in beam multiplication system 400 having a longitudinal thickness on the order of $\sim 2d_2$. In contrast, in beam multiplication system 500, only third diffractive element 540 and second diffractive element 530 are separated by distance d, enabling beam multiplication system 500 to have a longitudinal thickness on the order of ~d.

Figure 6:
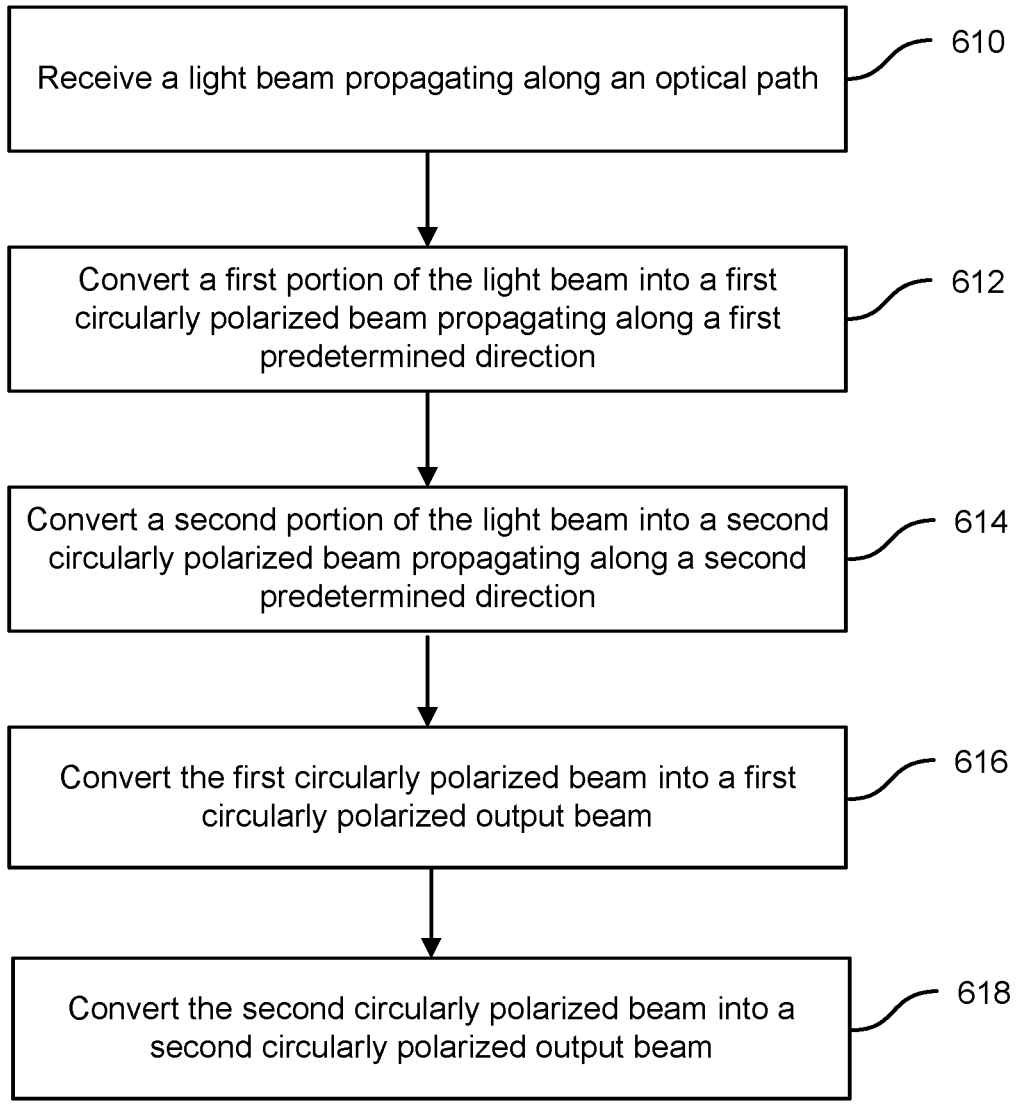
FIG. 6 illustrates an example of a flow for operating a beam multiplication system in accordance with an embodiment of the present disclosure.

FIG. 6 illustrates an example of a flow for operating a beam multiplication system in accordance with an embodiment of the present disclosure. The method 600 of operating the beam multiplication system includes receiving a light beam propagating along an optical path (610). As discussed in relation to the operation of beam multiplication system 300 illustrated in FIG. 3, the light beam can be an unpolarized beam or a linearly polarized beam. The optical path is parallel to the longitudinal z-axis in some embodiments and the multiple output beams provided by the beam multiplication system are laterally separated from each other in the lateral plane (i.e., the x-y plane) orthogonal to the optical path.

The method also includes converting, using a first diffractive element, a first portion of the light beam into a first circularly polarized beam propagating along a first predetermined direction (612) and converting, using the first diffractive element, a second portion of the light beam into a second circularly polarized beam propagating along a second predetermined direction (614). The first predetermined direction can be a direction associated with a first positive diffracted order (m=+1) lying in the y-z plane and the second predetermined direction can be a direction associated with a first negative diffracted order (m=−1) that also lies in the y-z plane. Thus, both the first predetermined direction and the second predetermined direction can be parallel to a plane (e.g., the y-z plane).

The method further includes converting, using a second diffractive element, the first circularly polarized beam into a first circularly polarized output beam (616) and converting, using the second diffractive element, the second circularly polarized beam into a second circularly polarized output beam (618). The first circularly polarized output beam can propagate in a direction parallel to the optical path and the second circularly polarized output beam can propagate in the direction parallel to the optical path. In other embodiments, the output beams can propagate along directions aligned at a non-zero angle with respect to the optical path. Thus, embodiments of the present disclosure provide for the multiplication of a single input beam into two or more output beams having a predetermined, lateral separation between the output beams, with the method illustrated in FIG. 6 providing two output beams separated from each other by a separation distance measured along an axis (e.g., the y-axis) orthogonal to the optical path (e.g., the z-axis).

In some embodiments, the first diffractive element and the second diffractive element, which can be liquid-crystal-based Pancharatnam-Berry phase optical elements, are interchangeable. The light beam can be characterized by a linearly polarized state or an unpolarized state. Moreover, the first circularly polarized beam can be characterized by a right-hand circular polarization and the second circularly polarized beam can be characterized by a second handedness opposite the first handedness (i.e., a left-hand circular polarization). In this case, the first circularly polarized output beam is characterized by the second handedness (i.e., a right-hand circular polarization) and the second circularly polarized output beam is characterized by the first handedness (i.e., a left-hand circular polarization).

In an alternative embodiment, the method includes converting, using a quarter wave plate, the first circularly polarized output beam into a first linearly polarized light beam and the second circularly polarized output beam into a second linearly polarized light beam. The method also includes converting, using a third diffractive element, the first linearly polarized light beam into a first circularly polarized beam propagating in a third predetermined direction and a second circularly polarized beam propagating in a fourth predetermined direction as well as the second linearly polarized light beam into a third circularly polarized beam propagating in the third predetermined direction and a fourth circularly polarized beam propagating in the fourth predetermined direction. The method further includes changing, using a fourth diffractive element the first circularly polarized beam into a first circularly polarized output beam propagating parallel to the optical path, the second circularly polarized beam into a second circularly polarized output beam propagating parallel to the optical path, the third circularly polarized beam into a third circularly polarized output beam propagating parallel to the optical path, and the fourth circularly polarized beam into a fourth circularly polarized output beam propagating parallel to the optical path.

The third predetermined direction and the fourth predetermined direction can be parallel to a second plane (e.g., the x-z plane) orthogonal to the plane (e.g., the y-z plane) discussed above. Thus, using embodiments of the present disclosure, each of the first circularly polarized output beam, the second circularly polarized output beam, the third circularly polarized output beam, and the fourth circularly polarized output beam can be separated from each other by a lateral separation distance measured in a plane (e.g., the x-y plane) orthogonal to the optical path (e.g., the z-axis).

It should be appreciated that the specific steps illustrated in FIG. 6 provide a particular method of operating a beam multiplication system according to an embodiment of the present disclosure. Other sequences of steps may also be performed according to alternative embodiments. For example, alternative embodiments of the present disclosure may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7A:
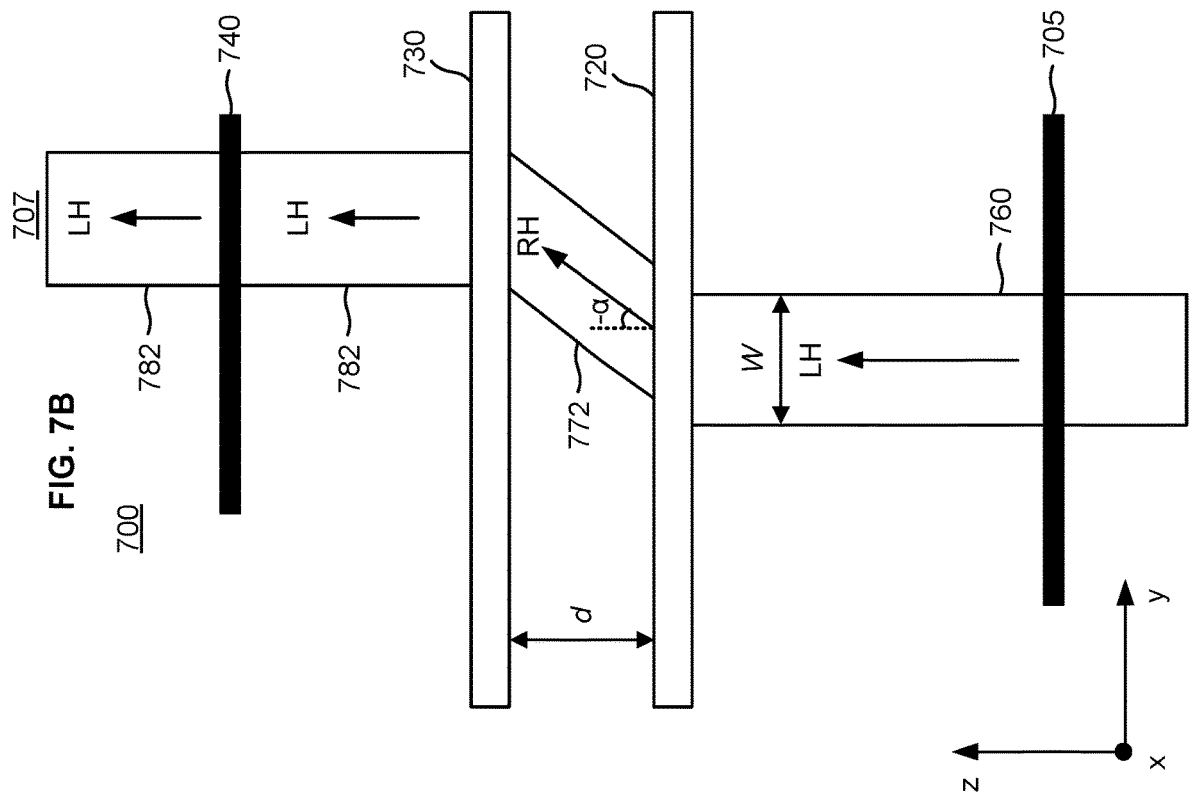
FIG. 7A illustrates a schematic diagram of an optical switch in a first operating condition in accordance with an embodiment of the present disclosure.

FIG. 7A illustrates a schematic diagram of an optical switch in a first operating condition in accordance with an embodiment of the present disclosure. Light beam 710 is input into optical switch 700 by passing through polarization rotator 705. In this embodiment, polarization rotator 705 produces a right-hand circularly polarized beam to serve as light beam 710. Light beam 710 has a width W. Since light beam 710 is a right-hand circularly polarized beam, if all diffracted orders other than the first positive diffracted order and the first negative diffracted order are suppressed, the handedness of the input light beam is changed to a left-hand circularly polarized beam and the output light beam is diffracted into the first positive diffracted order as a result of diffraction from first diffractive element 720. Thus, first diffractive element 720 diffracts light beam 710 into the first positive diffracted order and converts light beam 710 into left-hand circularly polarized beam 722, which is propagating at an angle α. As discussed in relation to FIG. 3, second diffractive element 730 is positioned a distance d, i.e., a longitudinal separation distance, from first diffractive element 720 and is aligned to be parallel to first diffractive element 720. Second diffractive element 730 receives left-hand circularly polarized beam 722 propagating at angles α. Second diffractive element 730, which can be identical to first diffractive element 720, thereby providing for the interchangeability of second diffractive element 730 and first diffractive element 720, converts left-hand circularly polarized beam 722 into a right-hand circularly polarized output beam 732 propagating parallel to the longitudinal direction (i.e., the z-axis). Polarization switch 740 is then utilized to transmit right-hand circularly polarized output beam 732. Although polarization switch 740 is not required, the use of polarization switch 740 can improve the image quality. As will be evident to one of skill in the art, polarizing optics do not always result in the polarized light being in a single linear polarization state or in a single circularly polarized state. Rather, some light in undesired polarization states may be present after a polarizer or be introduced by polarizing optics, such as quarter wave plates, half wave plates, and the like. Moreover, although the diffraction efficiency of diffractive elements can be high, some input light can be diffracted in diffraction orders that are being suppressed or otherwise into undesired diffraction orders. As a result, various embodiments in accordance with the present disclosure utilize one or more polarization switches, for example polarization switch 740 illustrated in FIGS. 7A and 7B to reduce or eliminate light in undesired polarization states. Thus, referring to FIG. 2D, when either image 220 or 225 is intended to be generated, stray light present in one image will be prevented from being present in the other image.

Figure 7B:
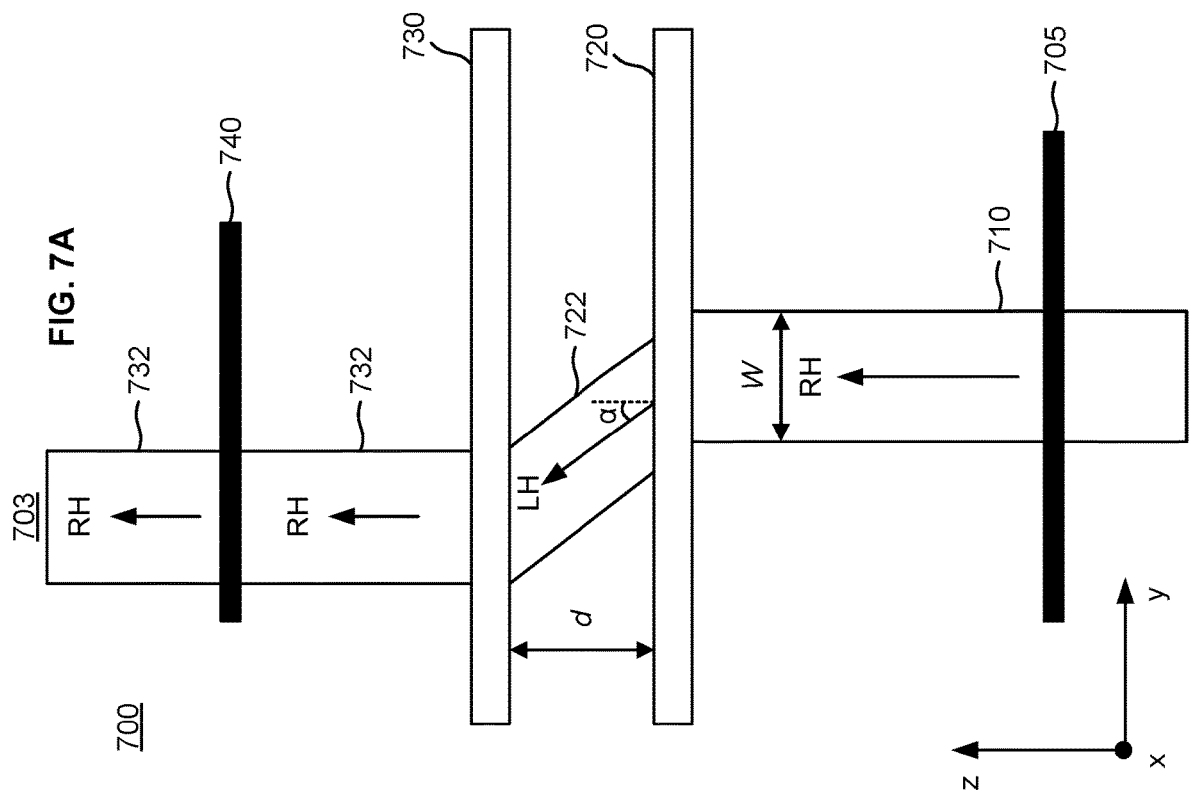
FIG. 7B illustrates a schematic diagram for the optical switch in a second operating condition in accordance with an embodiment of the present disclosure.

FIG. 7B illustrates a schematic diagram for the optical switch in a second operating condition in accordance with an embodiment of the present disclosure. In this second operating state, light beam 760 is input into optical switch 700 by passing through polarization rotator 705. In this embodiment, polarization rotator 705 produces a left-hand circularly polarized beam to serve as light beam 760. Light beam 760 has a width W. Since light beam 760 is a left-hand circularly polarized beam, if all diffracted orders other than the first positive diffracted order and the first negative diffracted order are suppressed, the handedness of the input light beam is changed to a right-hand circularly polarized beam and the output light beam is diffracted into the first negative diffracted order as a result of diffraction from first diffractive element 720. Thus, first diffractive element 720 diffracts light beam 760 into the first negative diffracted order and converts light beam 760 into right-hand circularly polarized beam 772, which is propagating at an angle −α. As discussed in relation to FIG. 3, second diffractive element 730 is positioned a distance d, i.e., a longitudinal separation distance, from first diffractive element 720 and is aligned to be parallel to first diffractive element 720. Second diffractive element 730 receives right-hand circularly polarized beam 772 propagating at angle −α. Second diffractive element 730, which can be identical to first diffractive element 720, thereby providing for the interchangeability of second diffractive element 730 and first diffractive element 720, converts right-hand circularly polarized beam 772 into a left-hand circularly polarized output beam 782 propagating parallel to the longitudinal direction (i.e., the z-axis). Polarization switch 740 is then utilized to transmit left-hand circularly polarized output beam 782. As discussed above, although polarization switch 740 is not required, the use of polarization switch 740 can reduce or eliminate light in undesired polarization states. In some embodiments, polarization switch 740 can be utilized to implement beam intensity control, modulating beam intensity. Thus, optical switch 700 can be utilized to not only control beam position, but beam intensity.

As illustrated in FIGS. 7A and 7B, the use of polarization rotator 705 in combination with first diffractive element 720 and second diffractive element 730 enables an optical switch that can be used to select between a first beam positioned at first location 703 and a second beam positioned at second location 707. Thus, one of two spatially separated output light beams that are laterally separated from each other by separation distance s is produced by optical switch 700. By using active polarization control implemented via control of polarization rotator 705, the spatial separation functionality provided by the beam multiplication system can be utilized to select an output beam positioned at a predetermined location with respect to the input beam, enabling shifting of the image formed at the exit pupil of a laser beam scanning augmented reality system, for example, to correspond to the location of the pupil of the user's eye. In contrast with the beam multiplication system illustrated in FIG. 3, which produces two output beams with equal intensity, optical switch 700 provides a single output beam (i.e., either right-hand circularly polarized output beam 732 positioned at first location 703 or left-hand circularly polarized output beam 782 positioned at second location 707), which can approach 100% of the intensity of light beam 710, thereby maintaining image intensity. One of ordinary skill in the art would recognize many variations, modifications, and alternatives.

Figures 8A, 8B, 8C:
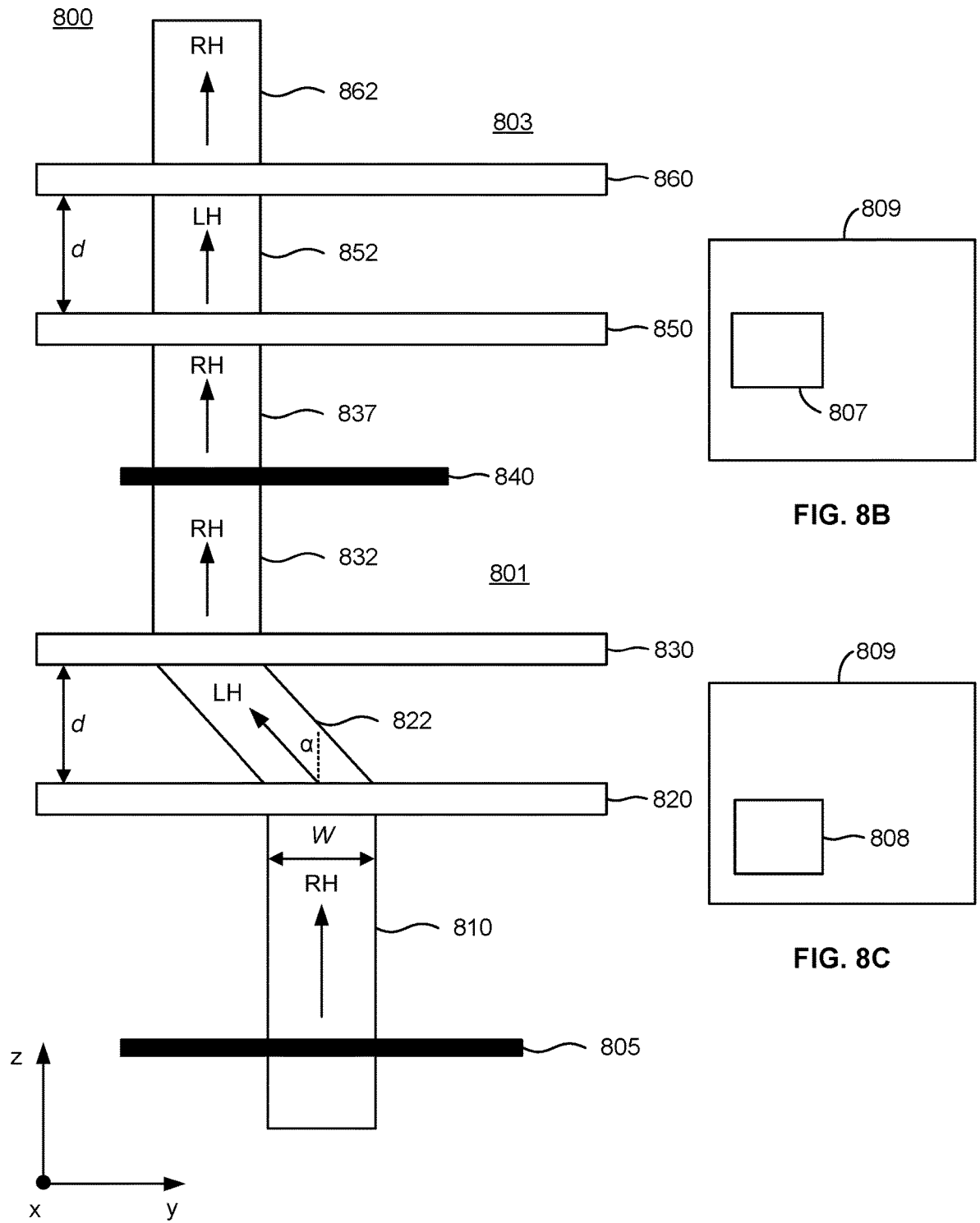
FIG. 8A illustrates a schematic diagram of another optical switch in a first operating condition in accordance with an embodiment of the present disclosure.
FIG. 8B illustrates a light beam present at a first location in the optical switch illustrated in FIG. 8A.
FIG. 8C illustrates a light beam present at an output of the optical switch illustrated in FIG. 8A.

FIG. 8A illustrates a schematic diagram of another optical switch in a first operating condition in accordance with an embodiment of the present disclosure. Light beam 810 is input into optical switch 800 by passing through polarization rotator 805. Polarization rotator 805 functions as a polarization switch to either maintain the polarization state of the light beam incident on polarization rotator 805 (i.e., operation in an "OFF" state) or to change the handedness of the light beam incident on polarization rotator 805 (i.e., operation in an "ON" state). In the embodiment illustrated in FIG. 8A, polarization rotator 805 is operated in the "OFF" state and light beam 810 incident on polarization rotator 805 maintains the right-hand circularly polarized nature of light beam 810.

Thus, light beam 810 is a right-hand circularly polarized beam after passing through polarization rotator 805. Light beam 810 has a width W. Since light beam 810 is a right-hand circularly polarized beam, if all diffracted orders other than the first positive diffracted order and the first negative diffracted order are suppressed, the handedness of the input light beam is changed to a left-hand circularly polarized beam and the output light beam is diffracted into the first positive diffracted order. Thus, first diffractive element 820 diffracts light beam 810 into the first positive diffracted order and converts light beam 810 into left-hand circularly polarized beam 822, which is propagating at an angle α. As discussed in relation to FIGS. 3 and 7A, second diffractive element 830 is positioned a distance d, i.e., a longitudinal separation distance, from first diffractive element 820 and is aligned to be parallel to first diffractive element 820. Second diffractive element 830 receives left-hand circularly polarized beam 822 propagating at angle α. Second diffractive element 830, which can be identical to first diffractive element 820, thereby providing for the interchangeability of second diffractive element 830 and first diffractive element 820, converts left-hand circularly polarized beam 822 into a right-hand circularly polarized output beam 832 propagating parallel to the longitudinal direction (i.e., the z-axis).

FIG. 8B illustrates a light beam present at a first location in the optical switch illustrated in FIG. 8A. At first location 801 in the lateral plane, right-hand circularly polarized output beam 832 has been laterally shifted to the left with respect to the position of light beam 810 by a distance s/2. Thus, as illustrated in FIG. 8B, image 807 is positioned on the left side of field of view 809.

Polarization switch 840 is then utilized to either transmit right-hand circularly polarized output beam 832 as right-hand circularly polarized input beam 837 or to change the handedness of right-hand circularly polarized output beam 832 into a left-hand circularly polarized beam (not shown). As will be described more fully below, depending on the polarization state of the beam input into the second set of diffractive elements, i.e., third diffractive element 850 and fourth diffractive element 860, the output beam generated by the second set of diffractive elements will either be located at a position in front of the plane of the image or behind the plane of the image.

In the embodiment illustrated in FIG. 8A, polarization switch 840 is operated in an "OFF" state such that right-hand circularly polarized output beam 832 is transmitted through polarization switch 840 as right-hand circularly polarized input beam 837. Right-hand circularly polarized input beam 837 is incident on third diffractive element 850, which converts right-hand circularly polarized input beam 837 into left-hand circularly polarized beam 852 propagating at an angle α with respect to the x-axis (i.e., the first positive diffracted order m=+1 directed out of the plane of the figure). Since right-hand circularly polarized input beam 837 was collimated, left-hand circularly polarized beam 852 is also collimated.

A fourth diffractive element 860 is positioned a distance d from third diffractive element 850 and is aligned to be parallel to third diffractive element 850. Fourth diffractive element 860 receives left-hand circularly polarized beam 852, which is propagating at angle α lying in the x-z plane. Fourth diffractive element 860, which can be identical to third diffractive element 850, thereby providing for the interchangeability of fourth diffractive element 860 and third diffractive element 850, converts left-hand circularly polarized beam 852 into a right-hand circularly polarized output beam 862 propagating parallel to the optical path.

FIG. 8C illustrates a light beam present at an output of the optical switch illustrated in FIG. 8A. At second location 803 in the lateral plane, right-hand circularly polarized output beam 862 has been laterally shifted to a location in front of the plane of the figure by a distance s/2. Thus, as illustrated in FIG. 8C, image 808 is positioned on the left, lower side of field of view 809.

In another embodiment, polarization rotator 805 could be operated in the "ON" state and right-hand circularly polarized output beam 832 could be converted to a left-hand circularly polarized input beam that would replace right-hand circularly polarized input beam 837 and be received at the second set of diffractive elements as a left-hand circularly polarized input beam that would be deflected into the plane of the figure rather than out of the plane of the figure, i.e., diffracted into the first negative diffraction order m=−1 propagating in the x-z plane.

In this embodiment, the left-hand circularly polarized input beam would be incident on third diffractive element 850, which would convert the left-hand circularly polarized input beam into a right-hand circularly polarized beam propagating at an angle −α with respect to the x-axis (i.e., the first negative diffracted order m=−1 directed into the plane of the figure). Fourth diffractive element 860 would then receive a right-hand circularly polarized beam and convert the right-hand circularly polarized beam into a left-hand circularly polarized output beam propagating parallel to the optical path. The left-hand circularly polarized output beam would form an image positioned on the left, upper side of field of view 809.

FIG. 9A illustrates a schematic diagram of the optical switch illustrated in FIG. 8A in a second operating condition in accordance with an embodiment of the present disclosure. Light beam 815, which is a left-hand circularly polarized beam, is input into optical switch 800 by passing through polarization rotator 805. In the embodiment illustrated in FIG. 9A, polarization rotator 805 is operated in the "ON" state and light beam 815 is converted into a right-hand circularly polarized beam 872 and diffracted into the first negative diffracted order propagating in the y-z plane as a result of diffraction from first diffractive element 820. Thus, first diffractive element 820 diffracts light beam 815 into the first negative diffracted order and converts light beam 815 into right-hand circularly polarized beam 872, which is propagating at an angle −α with respect to the y-axis. Second diffractive element 830 receives right-hand circularly polarized beam 872 propagating at angle −α and converts right-hand circularly polarized beam 872 into a left-hand circularly polarized output beam 882 propagating parallel to the longitudinal direction (i.e., the z-axis).

FIG. 9B illustrates a light beam present at a first location in the optical switch illustrated in FIG. 9A. At first location 901 in the lateral plane, left-hand circularly polarized output beam 882 has been laterally shifted to the right with respect to the position of light beam 810 by a distance s/2. Thus, as illustrated in FIG. 9B, image 907 is positioned on the right side of field of view 909.

Polarization switch 840 is then utilized to either transmit left-hand circularly polarized output beam 882 as left-hand circularly polarized input beam 887 or to change the handedness of left-hand circularly polarized output beam 882 into a right-hand circularly polarized beam (not shown). As will be described more fully below, depending on the polarization state of the beam input into the second set of diffractive elements, i.e., third diffractive element 850 and fourth diffractive element 860, the output beam generated by the second set of diffractive elements will either be located at a position in front of the plane of the image or behind the plane of the image.

In the embodiment illustrated in FIG. 9A, polarization switch 840 is operated in an "OFF" state such that left-hand circularly polarized output beam 882 is transmitted through the polarization switch as left-hand circularly polarized input beam 887. Left-hand circularly polarized input beam 887 is incident on third diffractive element 850, which converts left-hand circularly polarized input beam 887 into right-hand circularly polarized beam 892 propagating at an angle −α with respect to the x-axis (i.e., the first negative diffracted order m=−1 directed into the plane of the figure). Since left-hand circularly polarized input beam 887 was collimated, right-hand circularly polarized beam 892 is also collimated.

Fourth diffractive element 860 receives right-hand circularly polarized beam 892, which is propagating at angle −α lying in the x-z plane. Fourth diffractive element 860 converts right-hand circularly polarized beam 892 into a left-hand circularly polarized output beam 897 propagating parallel to the optical path.

FIG. 9C illustrates a light beam present at an output of the optical switch illustrated in FIG. 9A. At second location 903 in the lateral plane, left-hand circularly polarized output beam 897 has been laterally shifted to a location behind the plane of the figure by a distance s/2. Thus, as illustrated in FIG. 9C, image 908 is positioned on the right, upper side of field of view 909.

In another embodiment, polarization switch 840 could be operated in the "ON" state and left-hand circularly polarized output beam 882 could be converted to a right-hand circularly polarized input beam that would replace left-hand circularly polarized input beam 887 and be received at the second set of diffractive elements as a right-hand circularly polarized input beam that would be deflected out of the plane of the figure rather than into the plane of the figure, i.e., diffracted into the first positive diffraction order m=+1 propagating in the x-z plane.

In this embodiment, the right-hand circularly polarized input beam would be incident on third diffractive element 850, which would convert the right-hand circularly polarized input beam into left-hand circularly polarized beam propagating at an angle +α with respect to the x-axis (i.e., the first positive diffracted order m=+1 directed out of the plane of the figure). Fourth diffractive element 860 would then receive a left-hand circularly polarized beam and convert the left-hand circularly polarized beam into a right-hand circularly polarized output beam propagating parallel to the optical path. The right-hand circularly polarized output beam would form an image positioned on the right, lower side of field of view 909.

Thus, by operating polarization rotator 805 and polarization switch 840 in predetermined states, light beam 810/815 can be laterally shifted to one of four positions in a field of view in a controllable manner. In some embodiments, polarization switch 840 can be utilized to implement beam intensity control, modulating beam intensity. Thus, optical switch 800 can be utilized to not only control beam position, but beam intensity.

FIG. 10A illustrates a schematic diagram of an optical switch in a first operating condition in accordance with an embodiment of the present disclosure. Light beam 1010 is input into optical switch 1000 by passing through polarization rotator 1005. Polarization rotator 1005 functions as a polarization switch to either maintain the polarization state of the light beam incident on polarization rotator 1005 (i.e., operation in an "OFF" state) or to change the handedness of the light beam incident on polarization rotator 1005 (i.e., operation in an "ON" state). In the embodiment illustrated in FIG. 10A, polarization rotator 1005 is operated in the "OFF" state and light beam 1010 incident on polarization rotator 1005 maintains the right-hand circularly polarized nature of light beam 1010.

First diffractive element 1020 diffracts light beam 1010 into the first positive diffracted order and converts light beam 1010 into a left-hand circularly polarized beam, which is propagating at an angle α with respect to the y-axis. The operation of first diffractive element 1020 is similar to that described with respect to the first diffractive element 520 illustrated in FIG. 5. After diffraction from first diffractive element 1020, polarization switch 1025 is used to either maintain the polarization state of the diffracted beam in the left-hand circularly polarized state or to convert the left-hand circularly polarized beam into a right-hand circularly polarized beam. Accordingly, third diffractive element 1040 operates in a manner similar to that described with respect to third diffractive element 540 in FIG. 5, either converting the left-hand circularly polarized beam into a right-hand circularly polarized diffracted beam propagating at angle −α with respect to the x-axis or converting the right-hand circularly polarized beam into a left-hand circularly polarized diffracted beam propagating at angle +α with respect to the x-axis. In the embodiment illustrated in FIG. 10A, polarization switch 1025 is operated in the "OFF" state, resulting in the generation of right-hand circularly polarized diffracted beam 1032 propagating at angle α with respect to the y-axis and angle −α with respect to the x-axis, i.e., angled to the left and into the plane of the figure.

In order to redirect the beam generated by diffraction of right-hand circularly polarized diffracted beam 1032 to propagate parallel to the optical path (i.e., along the z-direction), second diffractive element 1030 and fourth diffractive element 1050 are positioned a distance d from first diffractive element 1020 and third diffractive element 1040. Diffraction by second diffractive element 1030 and fourth diffractive element 1050 also results in a change in the handedness of the beam incident on second diffractive element 1030 and fourth diffractive element 1050.

In the embodiment illustrated in FIG. 10A, since right-hand circularly polarized diffracted beam 1032 is present at location 1003 between the sets of diffractive elements, second diffractive element 1030 redirects the beam from propagation at angle α with respect to the y-axis to propagate along a direction aligned with the z-axis and converts right-hand circularly polarized diffracted beam 1032 to a left-hand circularly polarized diffracted beam. After diffraction from second diffractive element 1030, polarization switch 1045 is used to either maintain the polarization state of the diffracted beam in the left-hand circularly polarized state or to convert the left-hand circularly polarized beam into a right-hand circularly polarized beam. In the embodiment illustrated in FIG. 10A, polarization switch 1045 is operated in the "OFF" state, resulting in the left-hand circularly polarized diffracted beam being converted to right-hand hand circularly polarized output beam 1052 that is redirected from propagation at angle −α with respect to the x-axis to propagate along a direction aligned with the z-axis. After propagation through optical switch 1000 with both polarization switch 1025 and polarization switch 1045 operated in the "OFF" state, at second location 1007 in the lateral plane, right-hand circularly polarized output beam 1052 has been laterally shifted to the left by a distance s/2 and to a location behind the plane of the figure by a distance s/2. Thus, similar to right-hand circularly polarized output beam 862 as illustrated in FIG. 8C, right-hand circularly polarized output beam 1052 would form an image positioned on the left, lower side of the field of view. Polarization switch 1054 can then be utilized to transmit right-hand circularly polarized output beam 1052. Although polarization switch 1054 is not required, the use of polarization switch 1054 can improve the image quality by reducing or eliminating light in undesired polarization states.

FIG. 10B illustrates a schematic diagram of the optical switch illustrated in FIG. 10A in a second operating condition in accordance with an embodiment of the present disclosure. A light beam is input into optical switch 1000 by passing through polarization rotator 1005. In the embodiment illustrated in FIG. 10B, polarization rotator 1005 is operated in the "ON" state and the light beam incident on polarization rotator 1005 is converted to a left-hand circularly polarized beam 1060.

First diffractive element 1020 diffracts left-hand circularly polarized beam 1060 into the first negative diffracted order and converts left-hand circularly polarized beam 1060 into a right-hand circularly polarized beam, which is propagating at an angle −α with respect to the y-axis. After diffraction from first diffractive element 1020, polarization switch 1025 is used to either maintain the polarization state of the diffracted beam in the right-hand circularly polarized state or to convert the right-hand circularly polarized beam into a left-hand circularly polarized beam. Accordingly, third diffractive element 1040 operates in a manner similar to that described with respect to third diffractive element 540 in FIG. 5, either converting the right-hand circularly polarized beam into a left-hand circularly polarized diffracted beam propagating at angle α with respect to the x-axis or converting the left-hand circularly polarized beam into a right-hand circularly polarized diffracted beam propagating at angle −α with respect to the x-axis. In the embodiment illustrated in FIG. 10A, polarization switch 1025 is operated in the "ON" state, resulting in the generation of right-hand circularly polarized diffracted beam 1082 propagating at angle −α with respect to the y-axis and angle +α with respect to the x-axis, i.e., angled to the right and out of the plane of the figure.

In order to redirect the beam generated by diffraction of right-hand circularly polarized diffracted beam 1082 to propagate parallel to the optical path (i.e., along the z-direction), second diffractive element 1030 and fourth diffractive element 1050 are positioned a distance d from first diffractive element 1020 and third diffractive element 1040. Diffraction by second diffractive element 1030 and fourth diffractive element 1050 also results in a change in the handedness of the beam incident on second diffractive element 1030 and fourth diffractive element 1050.

In the embodiment illustrated in FIG. 10A, since right-hand circularly polarized diffracted beam 1082 is present at location 1003 between the sets of diffractive elements, second diffractive element 1030 redirects the beam from propagation at angle −α with respect to the y-axis to propagate along a direction aligned with the z-axis and converts right-hand circularly polarized diffracted beam 1032 to a left-hand circularly polarized diffracted beam. After diffraction from second diffractive element 1030, polarization switch 1045 is used to either maintain the polarization state of the diffracted beam in the left-hand circularly polarized state or to convert the left-hand circularly polarized beam into a right-hand circularly polarized beam. In the embodiment illustrated in FIG. 10B, polarization switch 1045 is operated in the "ON" state, resulting in the left-hand circularly polarized diffracted beam being converted to right-hand hand circularly polarized beam. The right-hand circularly polarized beam is then diffracted by fourth diffractive element 1050 to form left-hand circularly polarized output beam 1092 that is redirected from propagation at angle +α with respect to the x-axis to propagate along a direction aligned with the z-axis. After propagation through optical switch 1000 with both polarization switch 1025 and polarization switch 1045 operated in the "ON" state, at second location 1007 in the lateral plane, left-hand circularly polarized output beam 1092 has been laterally shifted to the right by a distance s/2 and to a location in front of the plane of the figure by a distance s/2. Polarization switch 1054 can then be utilized to transmit left-hand circularly polarized output beam 1092. Although polarization switch 1054 is not required, the use of polarization switch 1054 can improve the image quality by reducing or eliminating light in undesired polarization states. In some embodiments, one or more of polarization switch 1025, polarization switch 1045, or polarization switch 1054 can be utilized to implement beam intensity control, modulating beam intensity. Thus, optical switch 1000 can be utilized to not only control beam position, but beam intensity.

Figure 11:
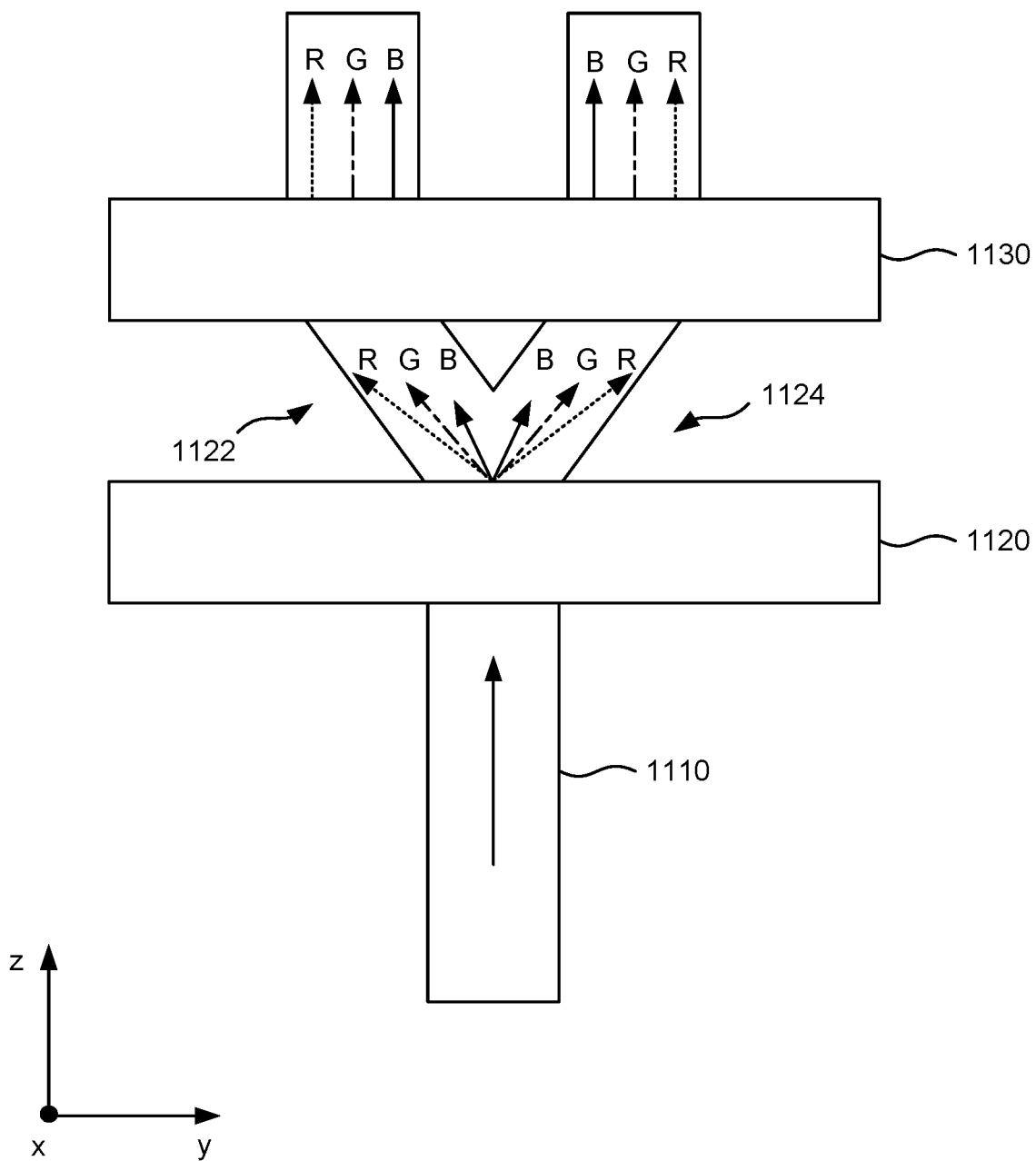
FIG. 11 illustrates a schematic diagram demonstrating color separation during operation of a beam multiplication system in accordance with an embodiment of the present disclosure.

FIG. 11 illustrates a schematic diagram demonstrating color separation during operation of a beam multiplication system in accordance with an embodiment of the present disclosure. As discussed above, the spectral content of the input light beam will impact the diffraction experienced passing through diffractive elements since diffractive effects are a function of wavelength. In FIG. 11, red, green, and blue components of input beam 1110 are illustrated as diffracting at different angles for both the first positive diffracted order 1122 and the first negative diffracted order 1124 as input beam 1110 passes through and is diffracted by first diffractive element 1120. Thus, red components diffract at a greater angle than blue components. After passing through and being diffracted by second diffractive element 1130, the red, green, and blue components are propagating along the longitudinal axis aligned with the optical path and are characterized by a spatial separation from each other. Thus, not only are multiple beams produced as discussed in relation to FIG. 3, but each of the output beams includes spectral components that are spatially separated.

Although color separation between the red, green, and blue components of input beam 1110 is illustrated in FIG. 11, this is not required and the design of the diffractive elements, as well as the dimensions of the various optical components, can enable reductions of elimination of color separation effects. As an example, if color separation is occurring in a known manner, the diffractive elements can be modified, for example, separate recording of the holographic film for each color component, to compensate for the color separation. Moreover, the input beam could be adjusted, with different color components impinging on the diffractive elements at different angles of incidence or different divergence angles in order to pre-correct for spectrally dependent diffraction that will occur in the diffractive elements. It should be noted that in some embodiments, compensation for color separation is not utilized because the spatial separation between color components is a small fraction of the spatial separation between the light beams or angular information is maintained independent of the color separation. As an example, since the various embodiments according to the present disclosure will form an expanded eyebox with different image locations, the color components present in each image may result in slightly different size light beams for each color component. This may result in a slight white point variation, but this will most likely be a second order effect in comparison to the spatial separation between images.

Figure 12:
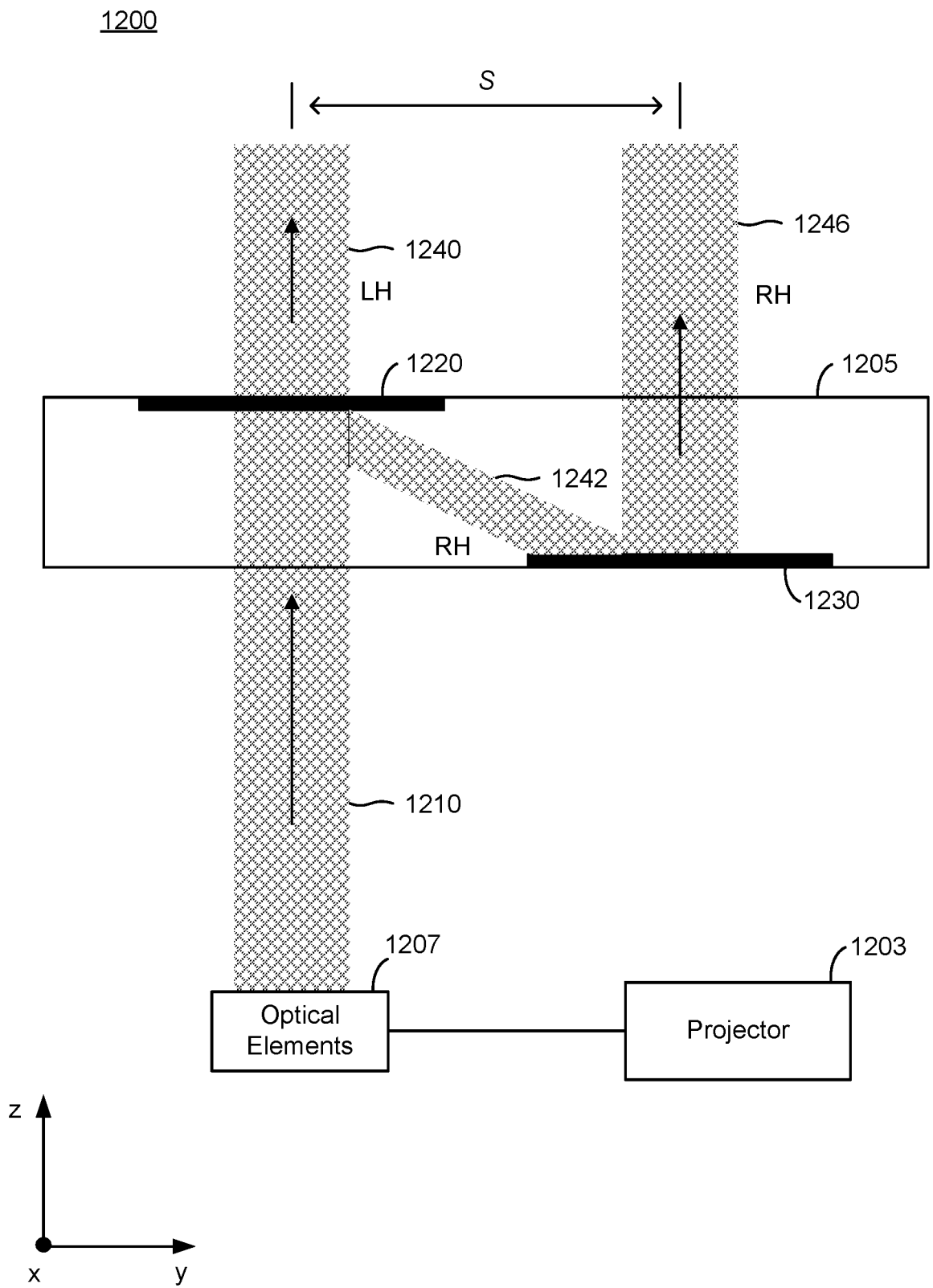
FIG. 12 illustrates a schematic diagram of a transmissive beam multiplication system in accordance with an embodiment of the present disclosure.

FIG. 12 illustrates a schematic diagram of a transmissive beam multiplication system in accordance with another embodiment of the present disclosure. The transmissive beam multiplication system 1200 illustrated in FIG. 12 utilizes reflective polarization volume gratings to selectively reflect or transmit light depending on the polarization state of the light. As illustrated in FIG. 12, projector 1203 can be utilized, with appropriate optical elements 1207 to couple input light from projector 1203 to impinge on transmissive beam multiplication system 1200. Thus, transmissive beam multiplication system 1200 can be utilized in place of the other beam multiplication systems described herein as well as utilized as an element of the optical switches described herein.

As illustrated in FIG. 12, projector 1203 and optical elements 1207 generate input light beam 1210 that is directed toward substrate 1205. Substrate 1205 supports first reflective polarization volume grating 1220 and second reflective polarization volume grating 1230. As described more fully below, each of first reflective polarization volume grating 1220 and second reflective polarization volume grating 1230 reflects light having a first polarization state and transmit light having a second polarization state.

Referring to FIG. 12, input light beam 1210 is unpolarized. After passing through substrate 1205, input light beam 1210 impinges on first reflective polarization volume grating 1220. First reflective polarization volume grating 1220 reflects right-hand circularly polarized light to form right-hand circularly polarized reflected beam 1242 and transmits left-hand circularly polarized light to form left-hand circularly polarized transmitted beam 1240. Second reflective polarization volume grating 1230 reflects right-hand circularly polarized reflected beam 1242 to form right-hand circularly polarized transmitted beam 1246. Thus two output beams are formed using transmissive beam multiplication system 1200: left-hand circularly polarized transmitted beam 1240 as a first output beam and right-hand circularly polarized transmitted beam 1246 as a second output beam.

The design of transmissive beam multiplication system 1200, including the thickness of substrate 1205, which impacts the lateral propagation distance for right-hand circularly polarized reflected beam 1242 along the y-direction between first reflective polarization volume grating 1220 and second reflective polarization volume grating 1230, the lateral distance measured along the y-direction between first reflective polarization volume grating 1220 and second reflective polarization volume grating 1230, and the input angle of input light beam 1210, enables generation of output beams with a predetermined separation distance s between the output beams. Thus, transmissive beam multiplication system 1200 provides multiple output beams in a manner similar to beam multiplication system 300 illustrated in FIG. 3.

In a manner similar to the cascading of multiple sets of diffractive elements as discussed in relation to FIG. 4A, multiple transmissive beam multiplication systems can be cascaded to generate additional output beams. Thus, as illustrated in FIG. 4, which shows the production of four output beams using a first set of diffractive elements producing two output beams laterally spaced apart from each other in the y-direction and a second set of diffractive elements introducing lateral spacing in the x-direction, multiple transmissive beam multiplication systems as illustrated in FIG. 12 can be cascaded with a quarter wave plate utilized between the transmissive beam multiplication systems to convert circularly polarized light into linearly polarized light in a manner similar to that discussed in relation to the operation of quarter wave plate 435 illustrated in FIG. 4.

In some implementations and in order to provide multiple color operation, different reflective polarization volume gratings can be provided for each desired color, for example, three reflective polarization volume gratings each designed for operation with either red, green, or blue wavelengths, respectively. In some embodiments, the multiple reflective polarization volume gratings are formed as separate layers adjacent each other in place of first reflective polarization volume grating 1220 and second reflective polarization volume grating 1230. Moreover, as discussed in relation to optical switch 800 illustrated in FIG. 8A and FIG. 9A, active polarization control elements can be utilized in conjunction with the multiple cascaded transmissive beam multiplication systems to generate a single output beam located at a predetermined position as illustrated in FIG. 8C or FIG. 9C.

Thus, the discussion provided in relation to the optical switches described herein is applicable to systems utilizing transmissive beam multiplication systems as appropriate. One of ordinary skill in the art would recognize many variations, modifications, and alternatives.

Figure 13:
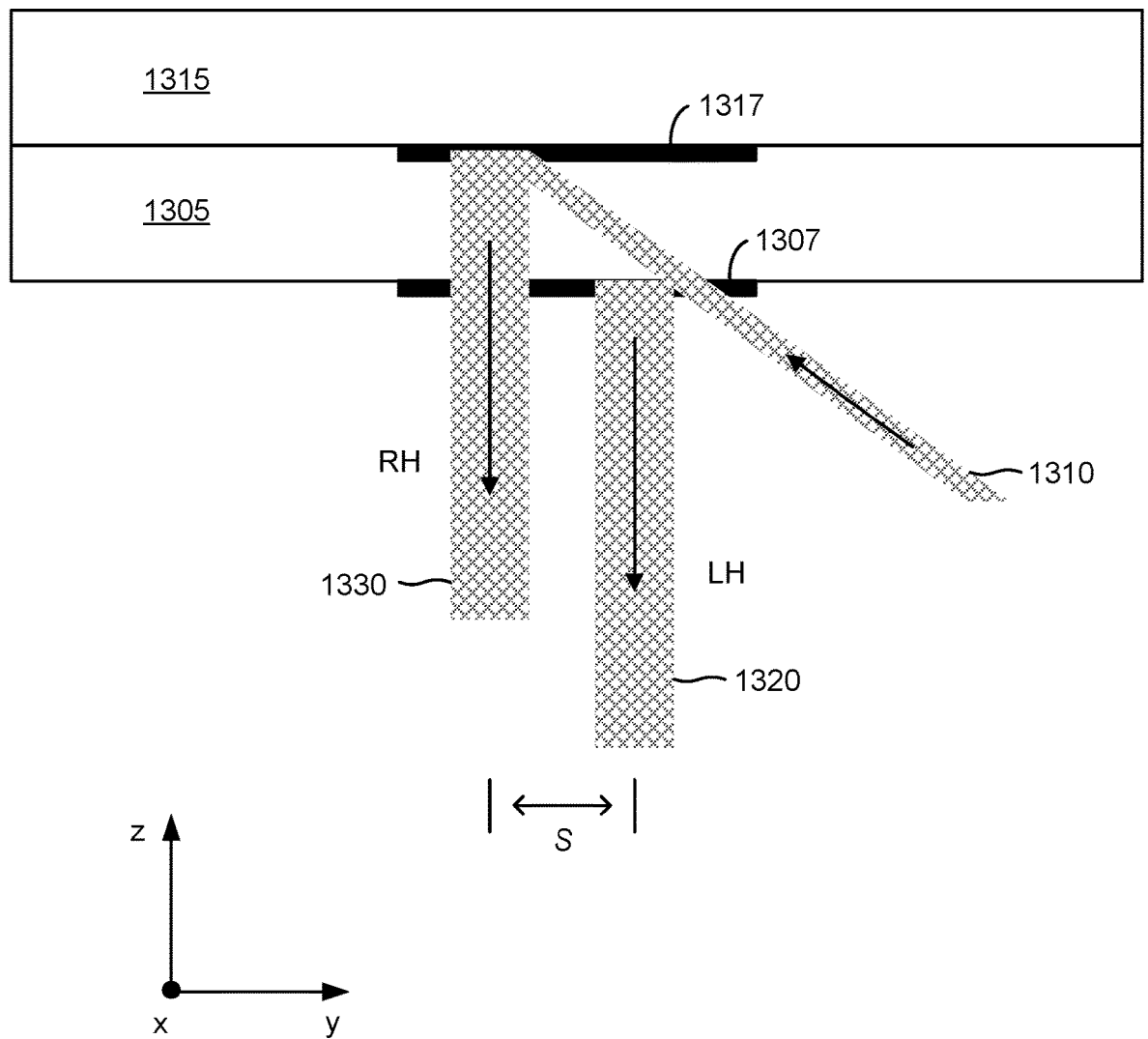
FIG. 13 illustrates a schematic diagram of a reflective beam multiplication system in accordance with embodiment of the present disclosure.

FIG. 13 illustrates a schematic diagram of a reflective beam multiplication system in accordance with an embodiment of the present disclosure. The reflective beam multiplication system 1300 illustrated in FIG. 13 utilizes reflective polarization volume gratings to selectively reflect light depending on the polarization state of the light. Although not illustrated in FIG. 13 for purposes of clarity, a projector as discussed herein can be utilized, with appropriate optical elements coupling input light from the projector to impinge on reflective beam multiplication system 1300. Thus, reflective beam multiplication system 1300 can be utilized in place of the other beam multiplication systems described herein as well as utilized as an element of the optical switches described herein.

As illustrated in FIG. 13, substrate 1305 supports first reflective polarization volume grating 1307 and substrate 1315 supports second reflective polarization volume grating 1317. As described more fully below, each of first reflective polarization volume grating 1307 and second reflective polarization volume grating 1317 reflects light having a first polarization state.

Referring to FIG. 13, input light beam 1310 is unpolarized. First reflective polarization volume grating 1307 is configured to reflect left-hand circularly polarized light and second reflective polarization volume grating 1317 is configured to reflect right-hand circularly polarized light. After impinging on first reflective polarization volume grating 1307 supported by substrate 1305, input light beam 1310 is reflected by first reflective polarization volume grating 1307 to form left-hand circularly polarized output beam 1320. The portion of input light beam 1310 that passes through first reflective polarization volume grating 1307 is incident on second reflective polarization volume grating 1317 supported by substrate 1315. The light incident on second reflective polarization volume grating 1317 is reflected by second reflective polarization volume grating 1317 to form right-hand circularly polarized output beam 1330. Thus two output beams are formed using reflective beam multiplication system 1300: left-hand circularly polarized transmitted beam 1320 as a first output beam and right-hand circularly polarized transmitted beam 1330 as a second output beam.

The design of reflective beam multiplication system 1300, including the thickness of substrate 1305, which impacts the distance between first reflective polarization volume grating 1307 and second reflective polarization volume grating 1317, and the input angle of input light beam 1310, enables generation of output beams with a predetermined separation distance s between the output beams. Thus, reflective beam multiplication system 1300 provides multiple output beams in a manner similar to beam multiplication system 300 illustrated in FIG. 3.

In a manner similar to the cascading of multiple sets of diffractive elements as discussed in relation to FIG. 4A, multiple reflective beam multiplication systems can be cascaded to generate additional output beams. Thus, as illustrated in FIG. 4, which shows the production of four output beams using a first set of diffractive elements producing two output beams laterally spaced apart from each other in the y-direction and a second set of diffractive elements introducing lateral spacing in the x-direction, multiple reflective beam multiplication systems as illustrated in FIG. 13 can be cascaded with a quarter wave plate utilized between the transmissive beam multiplication systems to convert circularly polarized light into linearly polarized light in a manner similar to that discussed in relation to the operation of quarter wave plate 435 illustrated in FIG. 4.

Figure 14:
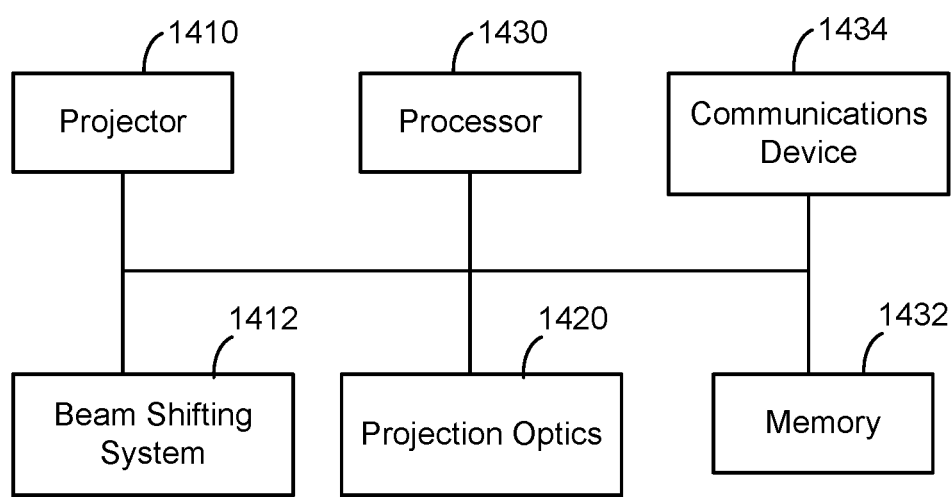
FIG. 14 illustrates a schematic diagram of a laser beam scanning augmented reality system in accordance with an embodiment of the present disclosure.

FIG. 14 illustrates a schematic diagram of a laser beam scanning augmented reality system in accordance with an embodiment of the present disclosure. As illustrated in FIG. 14, laser beam scanning augmented reality system 1400 includes a projector 1410, which can be implemented as discussed in relation to projector 110 in FIG. 1, and a beam shifting system 1412. In some embodiments, beam shifting system 1412 is integrated as an element of projector 1410, whereas in other embodiments, for example, when integrated with an eye-tracking system, beam shifting system 1412 can be implemented as a separate optical element, for example, as discussed in relation to beam multiplication system 300 in FIG. 3, beam multiplication system 400 in FIG. 4A, beam multiplication system 500 in FIG. 5, optical switch 700 in FIGS. 7A and 7B, optical switch 800 in FIGS. 8A and 9, optical switch 1000 in FIGS. 10A and 10B. Laser beam scanning augmented reality system 1400 can also include projection optics 1420 operable to direct light produced using projector 1410 and/or beam shifting system 1412 toward a user.

Laser beam scanning augmented reality system 1400 additionally includes processor 1430 (e.g., a microprocessor), memory 1432, and communications device 1434. Memory 1432, also referred to as storage media, stores computer-readable instructions of an application, where the computer-readable instructions are executable by processor 1430 to run the application. Additional description related to these elements is provided more fully below.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or network browser. It should be appreciated that alternate embodiments may have numerous variations from that described above. For example, customized hardware might also be used and/or particular elements might be implemented in hardware, software (including mobile software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a mobile computing device, a device controller, or a computational engine within an appliance, to name a few.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
a projector operable to produce a light beam propagating along an optical path; and
a set of optical elements disposed along the optical path, wherein the set of optical elements includes:
a first diffractive element operable to receive the light beam and generate:
a first circularly polarized beam propagating at a first predetermined angle with respect to the optical path; and
a second circularly polarized beam propagating at a second predetermined angle with respect to the optical path and equal and opposite to the first predetermined angle; and
a second diffractive element positioned a first predetermined distance from the first diffractive element and operable to:
convert the first circularly polarized beam into a first circularly polarized output beam; and
convert the second circularly polarized beam into a second circularly polarized output beam, wherein the first circularly polarized output beam and the second circularly polarized output beam are separated by a second predetermined distance.

2. The system of claim 1, wherein the optical path is aligned with a z-axis and the first predetermined angle and the second predetermined angle lie in a y-z plane.

3. The system of claim 1, further comprising:
a quarter wave plate disposed along the optical path and operable to convert the first circularly polarized output beam into a first linearly polarized light beam and the second circularly polarized output beam into a second linearly polarized light beam; and
a second set of optical elements disposed along the optical path, wherein the second set of optical elements includes:
a third diffractive element operable to receive:
the first linearly polarized light beam and generate:
a third circularly polarized beam; and
a fourth circularly polarized beam;
the second linearly polarized light beam and generate:
a fifth circularly polarized beam; and
a sixth circularly polarized beam; and
a fourth diffractive element positioned at the first predetermined distance from the third diffractive element and operable to:
convert the third circularly polarized beam into a third circularly polarized output beam propagating parallel to the optical path;
convert the fourth circularly polarized beam into a fourth circularly polarized output beam propagating parallel to the optical path;
convert the fifth circularly polarized beam into a fifth circularly polarized output beam propagating parallel to the optical path; and
convert the sixth circularly polarized beam into a sixth circularly polarized output beam propagating parallel to the optical path.

4. The system of claim 3, wherein:
the third circularly polarized beam and the fourth circularly polarized beam propagate at a third predetermined angle with respect to the optical path and equal in magnitude to the first predetermined angle; and
the fifth circularly polarized beam and the sixth circularly polarized beam propagate at a fourth predetermined angle with respect to the optical path and equal in magnitude to the second predetermined angle;
wherein the third predetermined angle and the fourth predetermine angle lie in an x-z plane.

5. The system of claim 3, wherein each of first diffractive element, the second diffractive element, the third diffractive element, and the fourth diffractive element comprises a liquid-crystal-based Pancharatnam-Berry phase optical element.

6. A method, comprising:
receiving a light beam propagating along an optical path;
converting, using a first diffractive element, a first portion of the light beam into a first circularly polarized beam;
converting, using the first diffractive element, a second portion of the light beam into a second circularly polarized beam;
converting, using a second diffractive element, the first circularly polarized beam into a first circularly polarized output beam; and
converting, using the second diffractive element, the second circularly polarized beam into a second circularly polarized output beam.

7. The method of claim 6, wherein the first diffractive element and the second diffractive element are interchangeable, liquid-crystal-based Pancharatnam-Berry phase optical elements.

8. The method of claim 6, wherein the first circularly polarized output beam and the second circularly polarized output beam propagate in a direction parallel to the optical path.

9. The method of claim 6, further comprising:
converting, using a quarter wave plate, the first circularly polarized output beam into a first linearly polarized light beam and the second circularly polarized output beam into a second linearly polarized light beam;
converting, using a third diffractive element, the first linearly polarized light beam into a third circularly polarized beam and a fourth circularly polarized beam;
converting, using the third diffractive element, the second linearly polarized light beam into a fifth circularly polarized beam and a sixth circularly polarized beam; and
changing, using a fourth diffractive element:
the third circularly polarized beam into a first circularly polarized output beam;
the fourth circularly polarized beam into a second circularly polarized output beam;
the fifth circularly polarized beam into a third circularly polarized output beam; and
the sixth circularly polarized beam into a fourth circularly polarized output beam.

10. The method of claim 9, wherein the first circularly polarized beam propagates in a first direction and the second circularly polarized beam propagates in a second direction, wherein each of the first direction and the second direction are parallel to a plane.

11. The method of claim 10, wherein the third circularly polarized beam propagates in a third direction and the fourth circularly polarized beam propagates in a fourth direction, wherein the third and the fourth directions are parallel to a second plane orthogonal to the plane.

12. The method of claim 9, wherein each of the first circularly polarized output beam, the second circularly polarized output beam, the third circularly polarized output beam, and the fourth circularly polarized output beam is separated from each other by a lateral distance measured in a plane orthogonal to the optical path.

13. The method of claim 6, wherein:
the light beam is characterized by a linearly polarized state or an unpolarized state;
the first circularly polarized beam is characterized by a first handedness;
the second circularly polarized beam is characterized by a second handedness opposite the first handedness;
the first circularly polarized output beam is characterized by the second handedness; and
the second circularly polarized output beam is characterized by the first handedness.

14. A system, comprising:
a projector operable to produce an input light beam;
a substrate having an input surface and an output surface;
a first reflective polarization volume grating coupled to the output surface of the substrate, wherein the first reflective polarization volume grating is operable to reflect light having a first polarization state and transmit light having a second polarization state; and
a second reflective polarization volume grating coupled to the input surface of the substrate, wherein the second reflective polarization volume grating is operable to reflect light having the first polarization state.

15. The system of claim 14, wherein the first polarization state comprises a left-hand circular polarization and the second polarization state comprises a right-hand circular polarization.

16. The system of claim 14, wherein the first reflective polarization volume grating is disposed on the output surface of the substrate and the second reflective polarization volume grating is disposed on the input surface of the substrate.

17. The system of claim 14, wherein the input light beam comprises an unpolarized beam, the system further comprising optical elements operable to direct the input light beam from the projector to the substrate.

18. The system of claim 14, wherein the light reflected from the first reflective polarization volume grating forms a first output beam and the light reflected from the second reflective polarization volume grating forms a second output beam.

19. The system of claim 18, wherein the substrate is characterized by a thickness and a lateral separation of the first output beam and the second output beam is a function of the thickness.

20. The system of claim 18, further comprising:
a quarter wave plate operable to receive the first output beam and the second output beam and generate a set of linearly polarized input beams;
a second substrate having a second input surface and a second output surface and operable to receive the set of linearly polarized input beams at the second input surface;
a third reflective polarization volume grating coupled to the second output surface of the second substrate; and
a fourth reflective polarization volume grating coupled to the second input surface of the second substrate.

\* \* \* \* \*